(12) United States Patent (10) Patent No.: US 9,021,361 B1
Pettinati et al. (45) Date of Patent: Apr. 28, 2015

(54) SYSTEM AND METHOD FOR FLOW VISUALIZATION AND INTERACTION WITH NETWORK TRAFFIC

(75) Inventors: Lucas Visvikis Pettinati, San Jose, CA (US); Lik Mui, Hayward, CA (US); Fenghui Zhang, Redmond, WA (US); Lin Liao, Bothell, WA (US); Doug Fox, San Jose, CA (US); Peng Li, Bellevue, WA (US); Zhiting Xu, Redmond, WA (US); Manuel Martinez, San Francisco, CA (US); Martin Wattenberg, Winchester, MA (US); Fernanda Viégas, Cambrige, MA (US)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/271,222

(22) Filed: Oct. 11, 2011

(51) Int. Cl.
*G06F 3/048* (2013.01)
*G06F 15/177* (2006.01)

(52) U.S. Cl.
CPC ...................................... *G06F 3/048* (2013.01)

(58) Field of Classification Search
CPC ...................................................... G06F 15/177
USPC ........................................................ 715/736
See application file for complete search history.

(56) References Cited

U.S. PATENT DOCUMENTS

| | | | |
|---|---|---|---|
| 5,751,956 A | 5/1998 | Kirsch | |
| 5,870,559 A | 2/1999 | Leshem et al. | |
| 6,275,862 B1 | 8/2001 | Sharma et al. | |
| 6,308,210 B1 | 10/2001 | Fields et al. | |
| 6,549,944 B1 | 4/2003 | Weinberg et al. | |
| 6,647,381 B1 | 11/2003 | Li et al. | |
| 6,781,599 B2 | 8/2004 | Abello et al. | |
| 6,981,037 B1 | 12/2005 | Srikant et al. | |
| 7,035,926 B1 * | 4/2006 | Cohen et al. | 709/225 |
| 7,043,702 B2 | 5/2006 | Chi et al. | |
| 7,103,838 B1 | 9/2006 | Krishnamurthy et al. | |
| 7,165,105 B2 | 1/2007 | Reiner et al. | |
| 7,219,300 B2 * | 5/2007 | Arquie et al. | 715/736 |
| 7,596,716 B2 * | 9/2009 | Frost et al. | 714/25 |

(Continued)

FOREIGN PATENT DOCUMENTS

| | | |
|---|---|---|
| KR | 10-2003-0088636 | 11/2003 |
| WO | WO-01/57706 A2 | 8/2001 |
| WO | WO-2004/003701 | 1/2004 |

OTHER PUBLICATIONS

Howard, Jennifer, "Citation by Citation, New Maps Chart Hot Research and Scholarships Hidden Terrain", The Chronicle, Sep. 11, 2011, 8 pages.

(Continued)

*Primary Examiner* — William Bashore
*Assistant Examiner* — Jeanette J Parker
(74) *Attorney, Agent, or Firm* — Foley and Lardner LLP; John D. Lanza

(57) ABSTRACT

Systems and methods for generating visualization data representing network traffic flow in or out of one or more nodes, each node representing the network traffic for one or more web pages. The method includes visualizing data configured to connect the one or more nodes with one or more connectors, each connector configured to connect two nodes, the one or more connectors configured to have a dimension that indicates a number of visits between two nodes. The network traffic capable of being highlighted when a user selects the one or more nodes or connectors.

20 Claims, 15 Drawing Sheets

(56) References Cited

U.S. PATENT DOCUMENTS

| | | | |
|---|---|---|---|
| 7,644,375 | B1 | 1/2010 | Anderson et al. |
| 7,676,465 | B2 | 3/2010 | Poola |
| 7,707,229 | B2 | 4/2010 | Tiyyagura |
| 7,792,843 | B2 | 9/2010 | Iverson |
| 7,792,844 | B2 | 9/2010 | Error et al. |
| 7,917,382 | B2 | 3/2011 | Cereghini et al. |
| 7,958,189 | B2 | 6/2011 | Bernstein |
| 8,010,657 | B2 | 8/2011 | Hall et al. |
| 8,065,300 | B2 | 11/2011 | Gupta et al. |
| 8,332,371 | B1 | 12/2012 | Brin |
| 2001/0020238 | A1 | 9/2001 | Tsuda |
| 2002/0147805 | A1 | 10/2002 | Leshem et al. |
| 2003/0023715 | A1* | 1/2003 | Reiner et al. .................. 709/224 |
| 2003/0115333 | A1* | 6/2003 | Cohen et al. .................. 709/227 |
| 2004/0059746 | A1 | 3/2004 | Error et al. |
| 2004/0196311 | A1 | 10/2004 | Cadez et al. |
| 2004/0267961 | A1 | 12/2004 | Dietz et al. |
| 2005/0203902 | A1 | 9/2005 | Davis et al. |
| 2006/0242145 | A1 | 10/2006 | Krishnamurthy et al. |
| 2006/0277212 | A1 | 12/2006 | Error |
| 2007/0112730 | A1 | 5/2007 | Gulli et al. |
| 2008/0181463 | A1 | 7/2008 | Error |
| 2008/0201357 | A1 | 8/2008 | Error et al. |
| 2009/0070366 | A1 | 3/2009 | Zhao et al. |
| 2009/0083421 | A1 | 3/2009 | Glommen et al. |
| 2010/0228731 | A1 | 9/2010 | Gollapudi |
| 2010/0251128 | A1* | 9/2010 | Cordasco ...................... 715/736 |
| 2010/0257024 | A1 | 10/2010 | Holmes et al. |
| 2011/0055710 | A1 | 3/2011 | Kirkby et al. |
| 2011/0167063 | A1 | 7/2011 | Tengli et al. |
| 2012/0047180 | A1 | 2/2012 | Kirshenbaum |
| 2012/0124030 | A1 | 5/2012 | Seetharama et al. |
| 2012/0158496 | A1 | 6/2012 | Solomon et al. |
| 2012/0201170 | A1 | 8/2012 | Sofman et al. |
| 2012/0290920 | A1 | 11/2012 | Crossley |
| 2013/0091270 | A1 | 4/2013 | Zhang et al. |

OTHER PUBLICATIONS

D. Edler & M. Rosvall (2010), Load and Simplify Network, Alluvial Generator, printed on Nov. 8, 2011, retrieved from internet URL: www.mapequation.org/alluvialgenerator/index.html, 6 pages.

Mapping Science, Eigenfactor.org, printed on Nov. 9, 2011, retrieved from internet URL: http://www.eigenfactor.org/map, 1 page.

Overview, Eigenfactor.org, printed on Nov. 9, 2011, retrieved from internet URL: http://www.eigenfactor.org/methods.php, 1 page.

Psychological Bulletin (1997), Eigenfactor.org, retrieved from internet URL: http://well-formed.eigenfactor.org/img/shots/change_02.png, 1 page.

Rosvall et al., Mapping Change in Large Networks. PLoS One, Jan. 27, 2010, 13 pages.

"Lockdown Media" pp. 1-12. [online], [retrieved on Oct. 17, 2011] Retrieved from NetScale Laboratory <http://netscale.cse.nd.edu/ >. <URL: http://netscale.cse.nd.edu/twiki/bin/view/Main/LockdownMedia>.

"Traffic Flow Visualizing User Sessions" by Ben Cunningham; Daniel MacDougall; Jeffery Heer, Stanford University—p. 1-8. [online], [retrieved on Oct. 17, 2011] https://graphics.stanford.edu/wikis/cs448b-09-fall/FPIPPCunninghamBen-MacDougallDaniel?action=AttachFile&do=get&target=trafficflow.pdf.

Traffic Flow Data Visualization—Initial Proposal—p. 1-8 From [online], [retrieved on Oct. 17, 2011] <http://graphics.stanford.edu/wikis/cs448b—09—fall/FPIPP-CunninghamBen—MacDougallDaniel>.

Li et al., Entropy-Based Criterion in Categorical Clustering, Proceedings of the 21st International Conference on Machine Learning, Banff, Canada, 2004, 8 pages.

Mathieu et al., Local Structure in the Web, WWW2003 Poster Template, http://www.2003.org/cdrom/papers/poster/p102/p102-mathieu.htm, 4 pages.

US Notice of Allowance on U.S. Appl. No. 13/271,214 Dtd Nov. 4, 2013.

US Office Action on U.S. Appl. No. 13/271,188 Dtd Oct. 25, 2013.

PCT/US/20120059569 International Search Report/Written Opinion, dated Mar. 19, 2013, 8 pgs.

Unica Netinsight, Unica.com, URL http://www.unica.com/documents/us/, Unica_ProSheet_NetInsight_1209.pdf, Date N/A.

US Office Action on U.S. Appl. No. 13/271,191 Dtd Jun. 19, 2013.

US Office Action on U.S. Appl. No. 13/271,188 Dtd May 13, 2013.

US Office Action on U.S. Appl. No. 13/271,214 Dtd Dec. 20, 2012.

US Office Action on U.S. Appl. No. 13/271,214 Dtd Jun. 3, 2013.

US Notice of Allowance on U.S. Appl. No. 13/271,214 Dtd Sep. 16, 2013.

Paul, Visual Sciences: Path Analysis using Path Browser, http://webanalyticssimplified.blogspot.com/, URL http://webanalyticssimplified.blogspot.com/2009/12/visual010sciencespath010analysis010using.html, Dec. 28, 2009.

Cunningham et al, TrafficFlow: Visualizing User Sessions, Stanford University, URL: https://graphics.stanford.edu/wikis/cs448b-09-fall/FPIPP-CunninghamBen-MacDougallDaniel?action=AttachFile&do=get&target=trafficflow.pdf, 8 pages.

Data Visualization, Stanford University, URL https://graphics.stanford.edu/wikis/cs448b-09-fall/FPIPP-CunninghamBen-MacDougallDaniel; retrieved from internet on Sep. 22, 2011; 11 pages.

IBM Coremetrics Web Analytics User Guide, Jun. 15, 2011, 122 pages.

Coremetrics—IBM WebSphere Portal Analytics Best Practices Overview, Aug. 2009, 20 pages.

Metronome Labs, Products::Metronome Explain, Mar. 27, 2010, 2 pages.

International Preliminary Report on Patentability mailed Apr. 24, 2014 in PCT Application No. PCT/US2012/059569.

US Notice of Allowance on U.S. Appl. No. 13/271,188 Dtd Jun. 19, 2014, 23 pages.

US Office Action on U.S. Appl. No. 13/271,189 mailed Oct. 3, 2014, 10 pages.

US Office Action on U.S. Appl. No. 13/271,199 mailed Oct. 27, 2014, 11 pages.

US Notice of Allowance on U.S. Appl. No. 13/271,191 Dtd Nov. 25, 2013.

US Notice of Allowance on U.S. Appl. No. 13/271,191 Dtd Feb. 18, 2014, 8 pages.

US Notice of Allowance on U.S. Appl. No. 13/271,191 dated Feb. 18, 2014, 8 pages.

\* cited by examiner

SYSTEM AND METHOD FOR FLOW VISUALIZATION AND INTERACTION WITH NETWORK TRAFFIC

BACKGROUND

The Internet provides access to a wide variety of content. For instance, images, audio, video, and web pages for many different topics are accessible through the Internet. Website owners that provide access to content want to gain insight regarding the performance of various web pages. However, due to growing complexity, a single website can have hundreds or thousands of web pages.

The amount of traffic information available regarding even a basic Internet transaction can be cumbersome to process for the interested parties. Users may visit numerous, different uniform resource locators (URLs), to complete substantially the same types of transactions. For example, the website owners may wish to know more about the number of users that actually add a product to an online shopping cart. However, a unique URL may be generated each time a user adds a product to a shopping cart. In addition, various parties may be interested in how users arrive or depart from certain web pages. For example, one user may perform an Internet search for a specific product, while another user may follow an advertisement link, to arrive at the same product description page. Therefore, the number of traffic paths that users may follow may also be large. For these and other reasons, generating visualizations of the flow of Internet or network traffic is challenging and difficult.

SUMMARY

In general, one aspect of the subject matter described in this specification can be embodied in a method for displaying Internet or network traffic data. The method includes systems and methods for generating visualization data representing network traffic flow in or out of one or more nodes, each node representing the network traffic for one or more web pages. The method includes visualizing data configured to connect the one or more nodes with one or more connectors, each connector configured to connect two nodes, the one or more connectors configured to have a dimension that indicates a number of visits between two nodes. Highlighting a portion of the network traffic when a user selects the one or more nodes or connectors.

In one implementation a system includes a processor configured to generate visualization data representing network traffic flow using one or more nodes, each node representing the internet traffic for one or more web pages. The processor configured to connect the one or more nodes with one or more connectors, each connector configured to connect at least two nodes, the one or more connectors configured to have a dimension that indicates a number of visits between two nodes. The processor configured to provide visualization data such that upon receiving user input a portion of the network traffic is highlighted when a user selects the one or more nodes or connectors.

A further implementation is one or more computer-readable media having instructions stored therein. The instructions are executable by one or more processors to cause the one or more processors to perform operations. The operations include generating visualization data representing network traffic flow in or out of one or more nodes, each node representing the network traffic for one or more web pages. The method includes visualizing data configured to connect the one or more nodes with one or more connectors, each connector configured to connect two nodes, the one or more connectors configured to have a dimension that indicates a number of visits between two nodes. A portion of the network traffic capable of being highlighted.

These implementations are mentioned not to limit the scope of the disclosure, but to provide examples to aid in the understanding thereof. Particular implementations can be developed to realize one or more of the following advantages.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
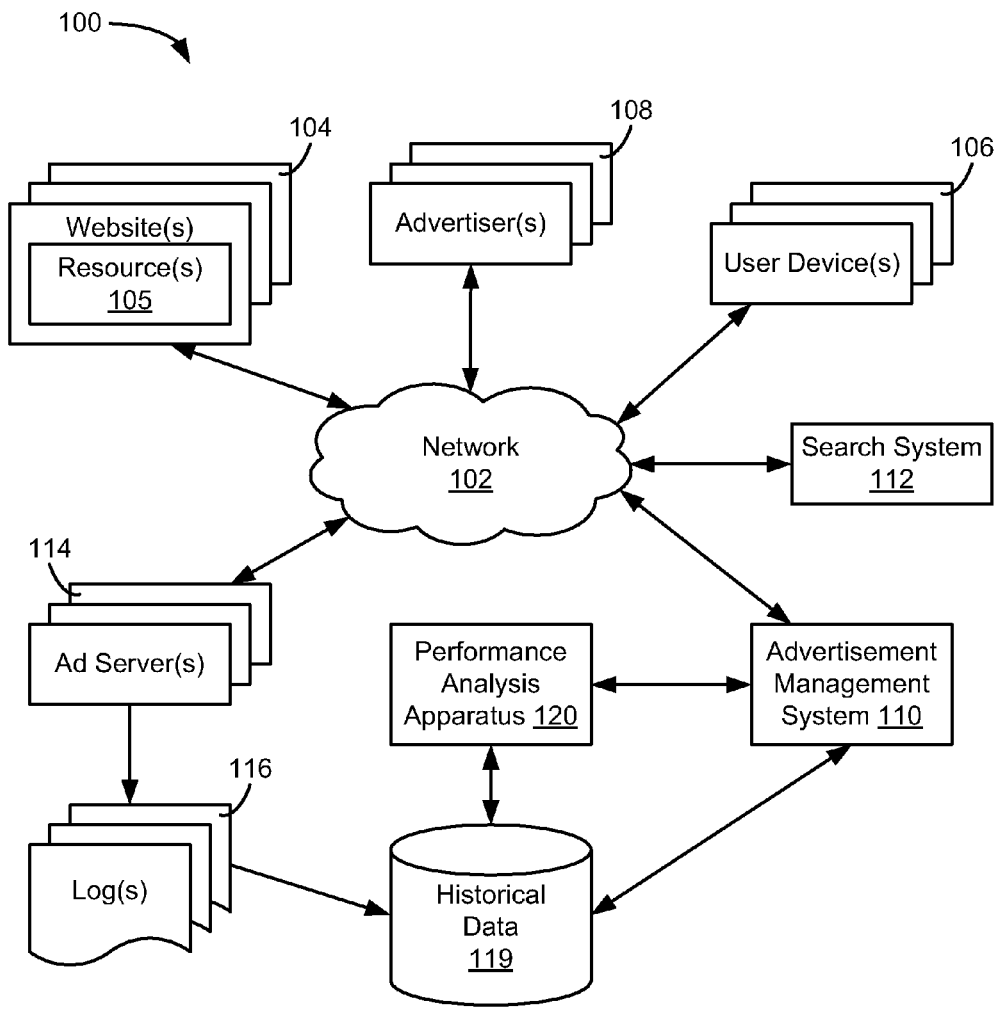
FIG. 1 is a block diagram of an example environment in which a data management system manages historical user visits in accordance with an illustrative implementation.

Network traffic provides a graphical representation of Internet or network traffic going into and out of a user chosen node. Each node represents one or more web pages that have been grouped together. A connector may be used to connect two nodes. The relative size of each connector that connects two nodes represents the relative amount of the traffic that traveled from one node to the other node or one web page to another. The connectors may represent the amount or volume of Internet or network traffic. User interactions clicking or hovering over a node or an edge and segmenting the traffic are clearly defined to surface the exit pages, conversion rates, and other relevant data in an interactive way.

Network traffic allows the website owner to choose the starting or ending node and visualize the traffic going into or out of the chosen node. Moreover, the website owner may add certain web pages to the node manually. A website owner may specify whether they wanted to add web pages to the node or remove web pages from the node. A user may further add more nodes to each side of the navigation visualization. Meaning the user may add nodes that have traffic to and from the user identified node. On many occasions a user may want to see traffic that goes into a node and the traffic that comes out of a node and which other nodes or websites the users that are represented by the traffic visit after passing through the node.

Insight into the flow of Internet or network traffic can be beneficial to website owners, advertisers, and other interested parties. For example, traffic data may include information as to how a user arrives at a website (e.g., by starting their web browsing at the website, by following a hyperlink from another website, etc.), how a user navigates within the website (e.g., by traversing from a product information page to a shopping cart page, by traversing from a shopping cart page to a purchase page, etc.), and where users go after visiting the website (e.g., by clicking on advertisements, by navigating to other websites, etc.). Interested parties can use traffic information to make changes to the website, tailor an advertising campaign a certain way, and perform other functions.

Interested parties (e.g., advertisers, website administrators, and other parties) may access various reports and visualizations that convey information regarding user interactions with the content and the flow of traffic through certain websites. A traffic analysis tool may aggregate and display traffic data, to assist an interested party in discerning how users interact with various web pages. For example, an advertiser may wish to know the percentage of users that actually click on an advertisement or how many users actually complete a purchase of the advertised product. The analysis and reporting of the traffic data can enable an advertiser to make advertising budget allocation decisions. In another example, a website administrator may make changes to the website that lead to a greater number of users reaching certain pages or goal of a website.

In particular, the analysis tool may operate to simplify the presentation of information to an interested party about the flow of traffic. To do so, the analysis tool may aggregate and group certain types of information into "nodes" in the visualization. In some implementations, displayed nodes may be "clusters" of URLs and the data relating to the URLs may be aggregated. For example, URLs associated with viewing a shopping cart may be aggregated into a single cluster for display on a traffic flow visualization. In another example, other types of URLs within a particular website may be clustered (e.g., a main page, a search page, etc.) and the traffic or the number of visits between these URLs may also be aggregated. In further implementations, other types of information can similarly be aggregated and grouped into nodes for a traffic flow visualization (e.g., demographic information, geographic location information, information about the hardware or software used to access websites, etc.). In another implementation, the nodes may be grouped by determining the uniform resource locator prefix based on a portion of the uniform resource locator item common to the plurality of flow paths representing web page visits.

The analysis tool may also automatically determine which nodes and flows of traffic are displayed in a visualization, according to various implementations. Aggregated flows of traffic among nodes may still be difficult to follow for a user of the visualization. In some implementations, the analysis tool may use a scoring function to determine whether or not certain paths of traffic are displayed in a traffic flow visualization.

FIG. 1 is a block diagram of an example environment 100 in which an advertisement management system manages advertising services. Environment 100 includes a network 102, such as a local area network (LAN), a wide area network (WAN), a wireless network, the Internet, or a combination thereof. Network 102 connects websites 104, user devices 106, advertisers 108, and an advertisement management system 110. Environment 100 may include any number of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

A resource 105 is any data that can be provided over network 102. The resource 105 is identified by a resource address that is associated with resource 105, such as a URL. Resources 105 can include web pages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under control of a user and is capable of requesting and receiving resources 105 over network 102. Example user devices 106 include personal computers, mobile communication devices, and other devices that can send and receive data over network 102. In some implementations, user device 106 may includes a user application, such as a web browser, to facilitate the sending and receiving of data over network 102.

User device(s) 106 can request resources 105 from a website 104. In turn, data representing resource 105 can be provided to user device 106 for presentation by user device 106 (e.g., on an electronic display, as an audible sound via a speaker, or a combination thereof). The data representing resource 105 can include data specifying a portion of the resource or a portion of a user display (e.g., a presentation location of a pop-up window or in a slot of a web page) in which advertisements can be presented. These specified portions of resource 105 or user display are referred to as advertisement slots.

To facilitate searching of the vast number of resources 105 accessible over network 102, environment 100 may include a search system 112 that identifies resources 105 by crawling and indexing resources 105 provided on websites 104. Data about resources 105 can be indexed based on resource 105 with which the data is associated. The indexed and, optionally, cached copies of resources 105 are stored in a search index (not shown).

User devices 106 can submit search queries to search system 112 over network 102. In response, search system 112 accesses the search index to identify resources 105 that are relevant to the search query. In one illustrative embodiment, a search query includes one or more keywords. Search system 112 identifies resources 105 that are responsive to the query, provides information about resources 105 in the form of search results and returns the search results to the user devices 106 in search results pages. A search result can include data generated by search system 112 that identifies a resource 105 that is responsive to a particular search query, and can include a link to resource 105. An example search result can include a web page title, a snippet of text or a portion of an image extracted from website 104, a rendering of resource 105, and the URL of the website 104. Search results pages can also include one or more advertisement slots in which advertisements can be presented.

A search result page can be sent with a request from search system 112 for the web browser of user device 106 to set an HTTP (Hyper Text Transfer Protocol) cookie. A cookie can represent, for example, a particular user device 106 and a particular web browser. For example, search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as search system 112 or other system, to track particular actions and status of a user over multiple sessions. A user may opt out of tracking user actions, for example, by disabling cookies in the browser's settings.

When a resource 105 or search results are requested by a user device 106 or provided to user device 106, advertisement management system 110 receives a request for advertisements to be provided with resource 105 or search results. The request for advertisements can include characteristics of the advertisement slots that are defined for the requested resource 105 or search results page, and can be provided to advertisement management system 110. For example, a reference (e.g., URL) to resource 105 for which the advertisement slot is defined, a size of the advertisement slot, and/or media types that are available for presentation in the advertisement slot can be provided to advertisement management system 110. Similarly, keywords (i.e., one or more words that are associated with content) associated with a requested resource 105 ("resource keywords") or a search query for which search results are requested can also be provided to advertisement management system 110 to facilitate identification of advertisements that are relevant to resource 105 or search query.

Based on data included in the request for advertisements, advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by advertisement management system 110.

Advertisement management system 110 selects an eligible advertisement for each advertisement slot of a resource 105 or of a search results page. Resource 105 or search results page is received by user device 106 for presentation by user device 106. User interaction data representing user interactions with presented advertisements can be stored in a historical data store 119. For example, when an advertisement is presented to the user via an ad server 114, data can be stored in a log(s) 116. Log(s) 116, as more fully described below, can be aggregated with other data in historical data store 119. Accordingly, historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to historical data store 119.

Similarly, when a user selects to traverse a link (e.g., a hyperlink, a presented advertisement, etc.), data representing the selection of the link can be stored in log(s) 116, a cookie, or historical data store 119. In some implementations, the data is stored in response to a request for a web page that is linked to an advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106. In further implementations, additional information may be collected about a particular user. For example, additional information may include information relating to the user's demographics, geographic location (e.g., based on a GPS function in a mobile device, based on an IP address, etc.), system information (e.g., which web browser is being use, the type of computing device used, etc.), and any other type of information about a user's interaction with environment 100.

Log(s) 116, or historical data store 119, also store references to advertisements and data representing conditions under which each advertisement was selected for presentation to a user. For example, historical data store 119 can store targeting keywords, bids, and other criteria with which eligible advertisements are selected for presentation. Additionally, historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

Advertiser(s) 108 can submit, to advertisement management system 110, campaign parameters (e.g., targeting keywords and corresponding bids) that are used to control distribution of advertisements. Advertiser(s) 108 can access advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time.

In some implementations, when a user accesses a web page, or another resource, from a referring web page (or other resource), the referring web page (or other resource) for that interaction can be identified, for example, by execution of code that is referenced by the web page being accessed and/or based on a URL that is used to access the web page. For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/%affiliate_identifier%promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting and visualizing the flow of traffic in environment 100.

Advertisement management system 110 includes a performance analysis apparatus 120 that may use traffic and other data stored in logs 116, historical data 119, or elsewhere, to generate one or more flow visualizations of traffic in environment 100. For example, performance analysis apparatus 120 may analyze cookie data to determine how many users traverse from one of websites 104 to another. In some implementations, performance analysis apparatus 120 may aggregate sets of data into nodes and/or traffic paths for the visualization. Performance analysis apparatus 120 may also determine which nodes and traffic paths are displayed in a traffic flow visualization. For example, performance analysis apparatus 120 may utilize one or more scoring functions based on the amount of traffic between nodes to determine which traffic paths are displayed. The scoring function may also be based on level weights. For example, each of the traffic paths going from nodes A to B to C may have a level weight of 1, whereas a path that traverses directly from A to C may have a level weight of 2.

Figure 2:
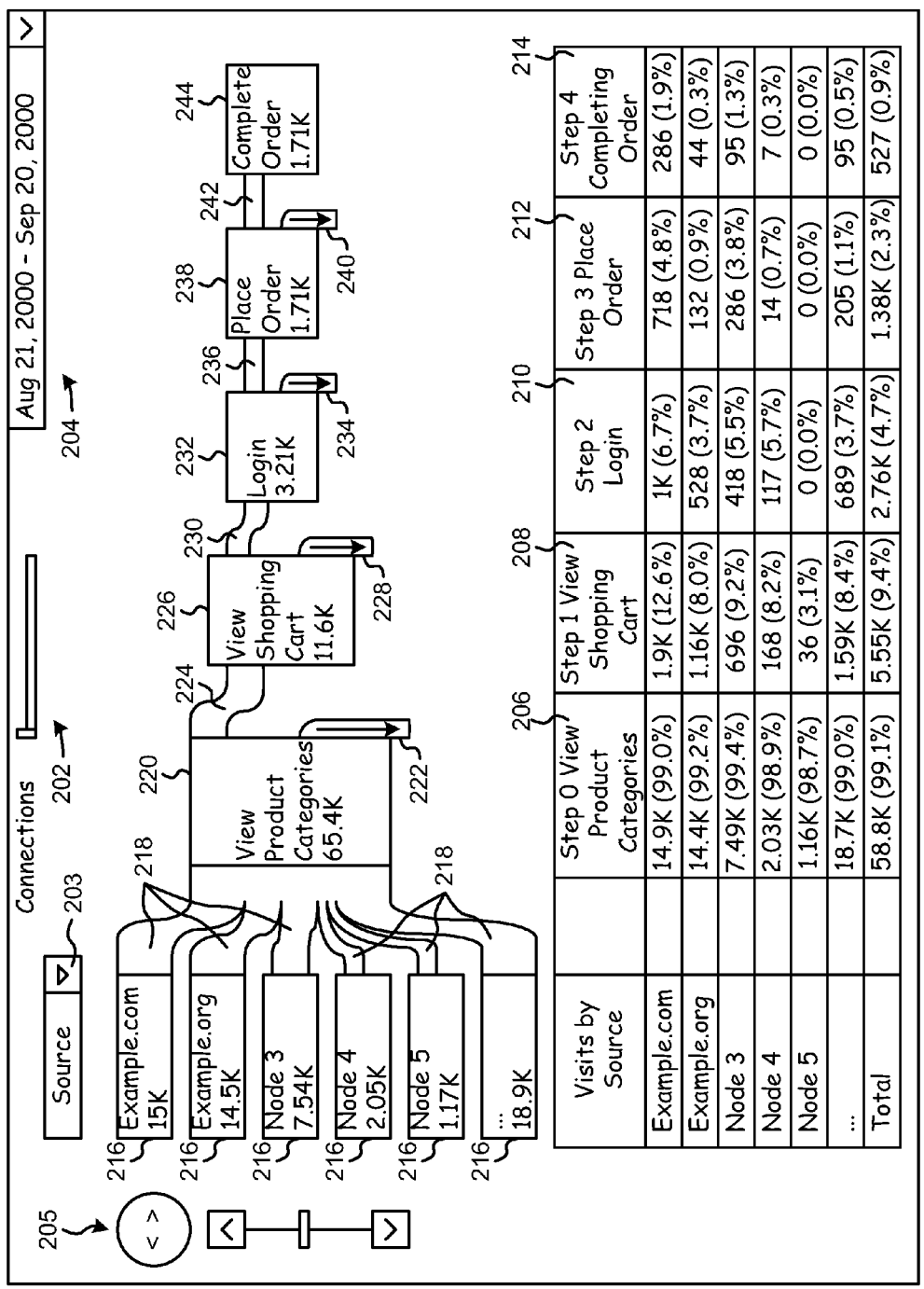
FIG. 2 is an illustration of an example visualization of online traffic.

FIG. 2 is an illustration of an example visualization 200 of network traffic. In general, visualization 200 displays a plurality of source nodes 216 (e.g., URL clusters, groups of demographics, groups of geographic locations, or any other grouping of information). For example, a first source node may be an aggregate of social networking sites while a second source node may be an aggregate of search engines. Some or all of source nodes 216 may also include a grouping of URLs for a particular website. For example, a particular website may include the following URLs:

http://www.example.com/home.html
http://www.example.com/search.aspx
http://www.example.com/results.aspx?type=simple&q=test In such a case, visualization 200 may aggregate these URLs into a single source node 216 labeled "Example.com."

Visualization 200 may include nodes that correspond to goals, according to some implementations. A goal may be a group of URLs associated with a certain action performed by users. For example, a first goal 206 may be to view product categories on a particular website or set of websites. Goal 206 may be used to generate a node 220, for example, by aggregating all URLs that display product information. A second goal 208 may be then to view a shopping cart, thereby indicating that a website visitor has added a product to their shopping cart. Goal 208 may be used to construct node 226. A third goal 210 may be for users to login to the website and used to construct a node 232. A fourth goal 212 may be for users to place an order and used to construct a node 238. Finally, a fifth goal 214 may be for users to complete their orders and utilized to construct a node 244.

Visualization 200 may display traffic flow information between nodes. For example, traffic paths 218 represent the flow of traffic from source nodes 216 to node 220. In various implementations, visualization 200 may also provide indicia of the amount of traffic between nodes (e.g., by varying the appearance of traffic flows by traffic volume, by providing icons or text indicative of traffic volume, or by other ways of conveying the amount of traffic between nodes). For example, traffic paths 218 are shown to vary in size in visualization 200, thereby representing their different traffic volumes. Similarly, traffic paths 224, 230, 236, and 242 represent the flow of traffic from node 220 to 244 (e.g., through completion of a purchase) via nodes 226, 232, and 238. As shown, the decreasing size of traffic paths 224, 230, 236, and 242 in visualization 200 indicate that only a fraction of users that view products at node 220 actually complete a purchase at node 244.

Visualization 200 may show drop-off traffic flows. In general, a drop-off traffic flow is one in which a user exits the process defined by goals 206, 208, 210, 212, and 214 (e.g., by stopping their web browsing session, by leaving to visit a different retailer's website, etc.). As shown, drop-off traffic paths 222, 228, 234, and 240 are attached to nodes 220, 226, 232, 238, respectively, to denote the flow of traffic away from each of these steps (e.g., that do not return to another node associated with a goal in visualization 200). In some implementations, drop-off traffic flows may include indicia that distinguishes them from other traffic flows (e.g., by applying a coloration, text or icon, etc.). For example, drop-off traffic path 222 may be colored red to denote the flow of traffic away from the product description pages of node 220 (e.g., by going to a competitor's website, by stopping the shopping process, etc.).

Visualization 200 may include source input 203, according to some implementations. Source input 203 is configured to receive a selection of a source type for source nodes 216. In various implementations, source nodes 216 may be of a different type of grouping than that of other nodes. For example, nodes 220, 226, 232, 238, 244 may be groups of web pages, while source nodes 216 may be groups based on system information about the devices used to visit the web pages. Source types may be indicative of a characteristic of a device that accesses the one or more web pages. Source types may include types of traffic sources (e.g., advertisement campaigns, referring websites, etc.), system information (e.g., web browser, operating system, installed programs, screen resolution, version information, etc.), types of geographic-related information (e.g., city, language, region, country, etc.), or any other way to group the network traffic data. A source type may also be user-defined. For example, source input 203 may receive a selection of multiple types, such as a selection of sources broken down by region and web browser.

Visualization 200 may include time input 204, according to some implementations. Time input 204 is configured to receive a selection of a time or date for which visualization 200 is to be generated. For example, time input 204 may receive a selection of a date range that can be used to filter traffic information provided by visualization 200. By way of example, an advertiser may wish to view website traffic information around a certain holiday, to tailor an advertising campaign. In other implementations, time input 204 may be preset (e.g., the previous week, the previous month, a time period defined in a user's profile, etc.).

Visualization 200 may include zoom input 205, which receives a selection of a zoom level. For example, a user of visualization 200 may use zoom input 205 to zoom out, thereby showing more nodes. Zoom input 205 may also be used to zoom in, thereby focusing the display of visualization 200 on only a subset of nodes. Zoom input 205 may be one or more icons, a sliding bar, or other selectable area of visualization 200.

In some implementations, visualization 200 may include a connection selector 202. Connection selector 202 receives a selection of an amount of traffic flows to be displayed on visualization 200. As shown, connection selector 202 is set to display only a minimal amount of traffic flows on visualization 200. Connection selector 202 may be an input field that receives a number of flows to display, one or more icons (e.g., an up and down arrow), a slide bar, or any other selectable area for receiving a selection on visualization 200.

Figure 3:
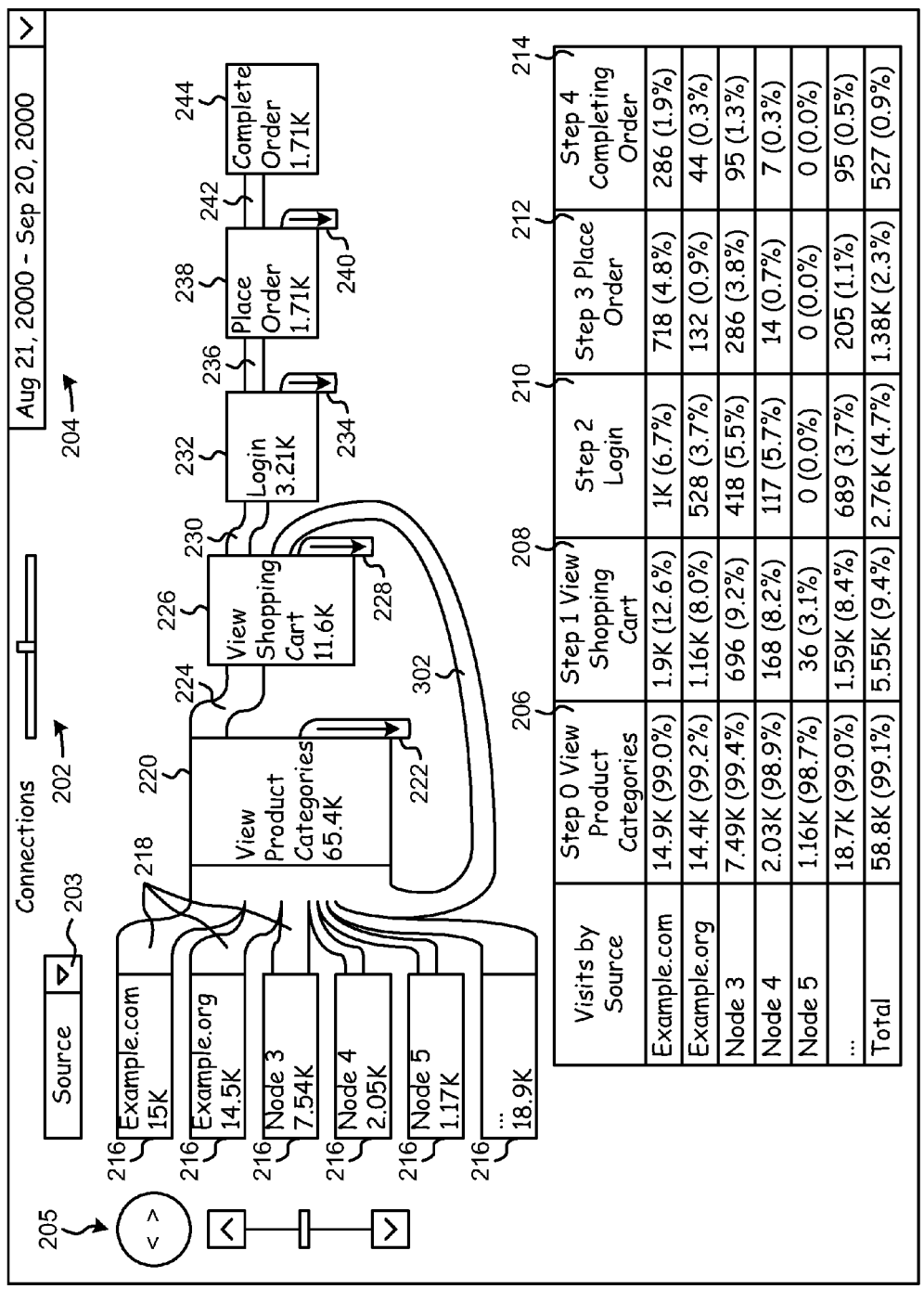
FIG. 3 is an illustration of an example visualization of online traffic showing more traffic flow connections.

FIG. 3 is an illustration of an example visualization 300, showing more traffic flow connections than that of visualization 200. Visualization 300 displays all of the same information as that of visualization 200, except that connection selector 202 has been adjusted in visualization 300 to display more traffic flow connections than that of visualization 200. In particular, traffic path 302 may be displayed in visualization 300 when connection selector 202 receives a command to increase the number of displayed traffic connections.

Traffic path 302 differs from that of the traffic flows in visualization 200 in that it denotes a backwards traffic path. For example, traffic path 302 may signify that a number of users return to view details about a second product, after adding a first product to their shopping carts (e.g., a user opts to continue shopping, instead of completing an order). This information may be pertinent to a user of visualization 300, in certain situations. For example, an online merchant may run a promotion where shipping is free when the total purchase price of an order is over a certain limit. Traffic path 302 allows the merchant to analyze how effective the promotion is at prompting customers to increase their orders.

In some implementations, a scoring function may be used to control which traffic flows are displayed in visualization 300. In some cases, a scoring function may be based in part on the volume of traffic over a particular traffic flow and/or a level weight. For example, one implementation may utilize a scoring function defined as follows:

$$f(e) = w_{traffic}(e) * w_{length}(e)$$

where e is a traffic flow between two nodes, $w_{traffic}(e)$ is a traffic weight factor based on the amount of traffic over e, and $w_{length}(e)$ is a length weight factor based on the number of levels traversed by e in visualization 200. For example, data flow 224 may have a higher traffic weight factor than that of data flow 242, since more users add items to their shopping carts than actually complete their purchases.

A length weight factor may be defined to give greater priority to displaying certain traffic flows over others in visualization 300. In some implementations, traffic flows that connect nodes from one level to the next along the levels of goals 206, 208, 210, 212, and 214 may be given the highest length weight factors. Therefore, traffic flows that follow the steps defined by goals 206, 208, 210, 212, and 214 may be displayed over other types of traffic flows. Traffic flows in the negative direction may be given lower length weight factors, to reduce the number of backwards traffic paths that may be displayed. For example, traffic path 302 may have a length of −1, since traffic flowing in this direction moves away from the overall goal of a completed purchase, i.e., goal 214. Traffic flows that also skip levels ("skips") may be given other length weight factors. For example, traffic flowing from a source node 216 directly to node 232 may have a length of three, since it skips over two levels.

According to various implementations, the traffic weight factor for a particular traffic flow may be high enough to offset a lower length weight factor. For example, traffic path 302 may have a lower length weight factor than that of traffic path 224, since it flows in the opposite direction. However, the amount of traffic flowing back from node 226 to node 220 may be great enough to cause traffic path 302 to be displayed. Other backwards traffic paths that have less traffic may still be concealed from display, depending on the level of detail defined by connection selector 202. For example, a flow of traffic from node 232 to 226 may be concealed while traffic path 302 is displayed, since traffic path 302 has a much larger volume of traffic.

Figure 4:
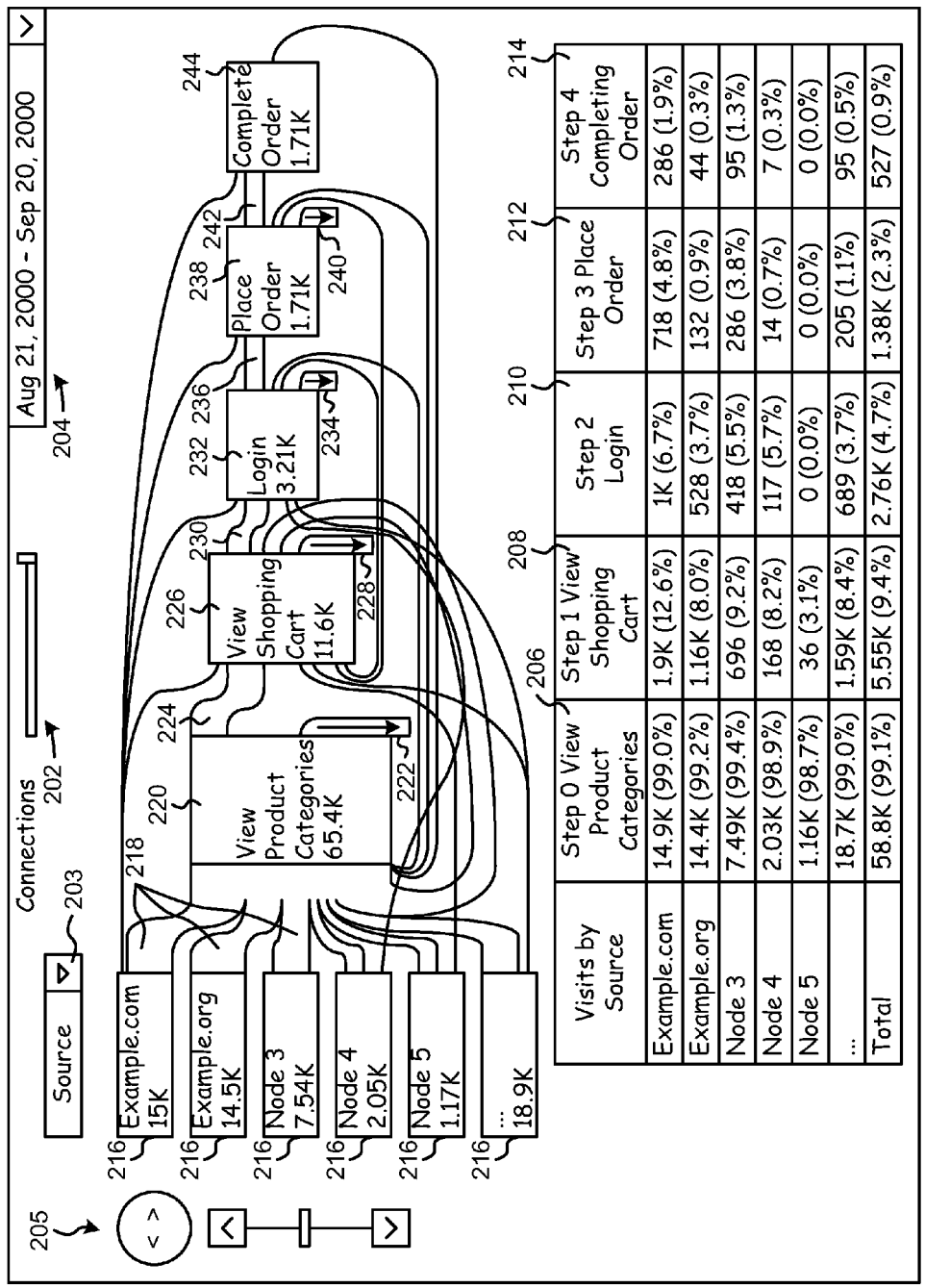
FIG. 4 is an illustration of an example visualization of online traffic showing even more traffic flow connections.

FIG. 4 is an illustration of an example visualization 400, showing more traffic flow connections than that of visualization 300 in FIG. 3. Visualization 400 displays all of the same information as that of visualizations 200 and 300, except that connection selector 202 has been adjusted in visualization 400 to display all traffic paths over which traffic flows between the nodes of visualization 400. For example, backwards paths and skips may be shown in visualization 400, even though they may have only a small volume of traffic. While only three settings of connection selector 202 are shown in FIGS. 2-4, any number of different settings may be used to vary the number of displayed traffic flows.

Figure 5:
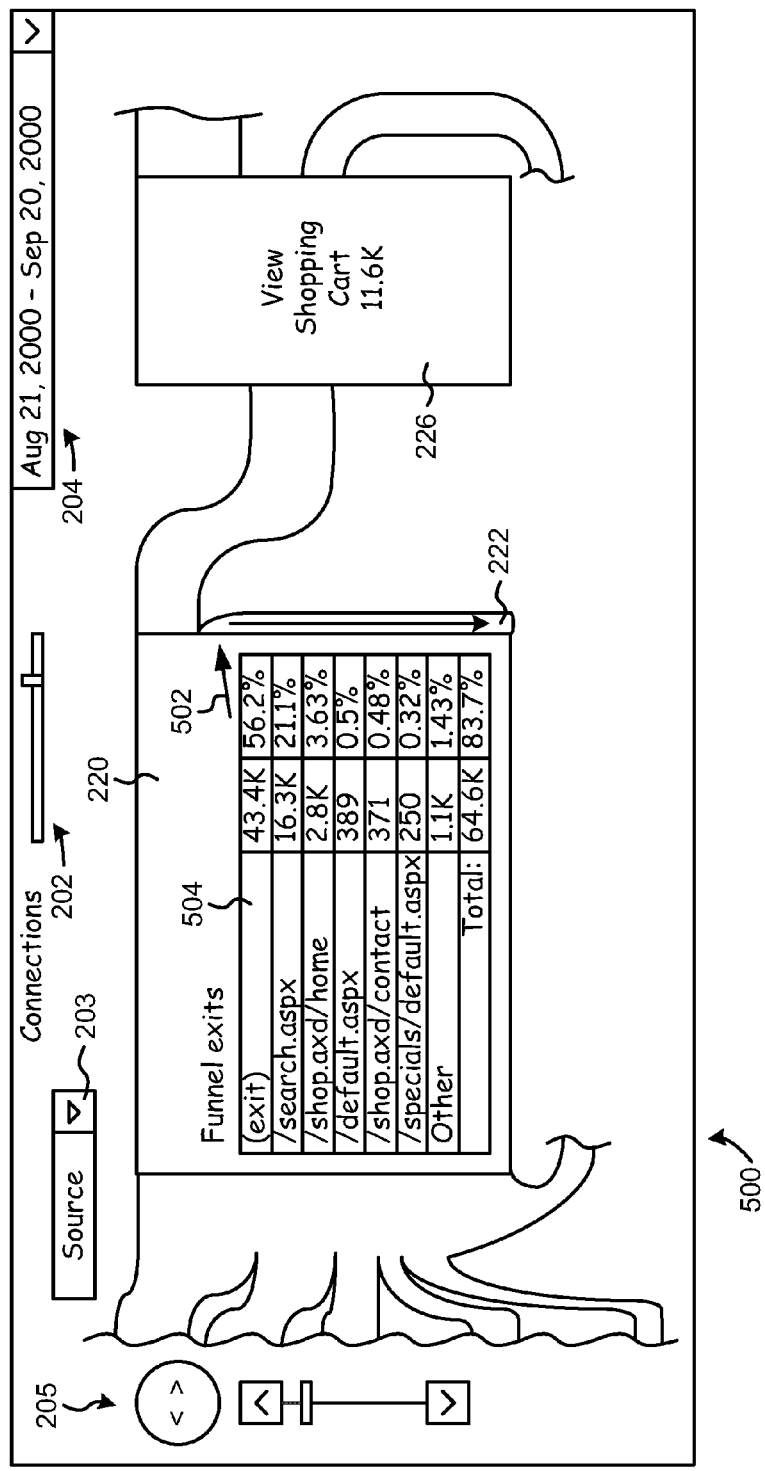
FIG. 5 is an illustration of an example visualization of online traffic showing aggregated traffic data.

FIG. 5 is an illustration of an example visualization 500 showing traffic path information 504. In some implementations, selection of a displayed node or traffic path may cause additional information about the node or traffic path to be displayed. For example, a node or traffic path may be selected via a pointer 502 controlled by a pointing device (e.g., as a "hover-over" action, using a mouse click, etc.), via a touch-screen display, using a keypad, or using any other form of selection mechanism. In response, additional information about the node or traffic path may be displayed. For example, additional information may be shown as a pop-up, in a separate window or tab, in a table, or using other forms of visual indicia in visualization 500.

As shown, traffic path information 504 may appear when drop-off traffic path 222 is selected using pointer 504. Traffic path information 504 may include additional information about where traffic flows from node 220 that does not connect to another node in visualization 500 (e.g., information about the individual traffic paths that are aggregated to form drop-off traffic path 222). Traffic path information 504 may, for example, include information about traffic that leaves the website associated with node 220 entirely. Such traffic may be denoted as "exit" traffic, or the like, in traffic path information 504. Traffic that stays within the website associated with node 220, but outside of the web pages of the nodes of visualization 500, may also be shown. For example, some web page visitors that view product information via a web page in node 220 may navigate to a contact page (e.g., /shop.axd/contact). Such a page may be within a vendor's website, but outside of the process defined for visualization 500.

Traffic path information 504 may include statistics about the traffic in drop-off traffic path 222. In some implementations, traffic path information 504 may include information about the amount of traffic that navigates to a specific exit and/or the percentage of drop-off traffic that navigates to the particular exit. For example, traffic path information 504 may indicate that 3.63% of drop-off traffic from node 220 navigates to a shopping home page for the website (e.g., /shop.axd/home). In some implementations, other statistics may be provided that incorporate the source type. For example, traffic path information 504 may include a breakdown of users by region that drop off from the process shown in visualization 500.

Figure 6:
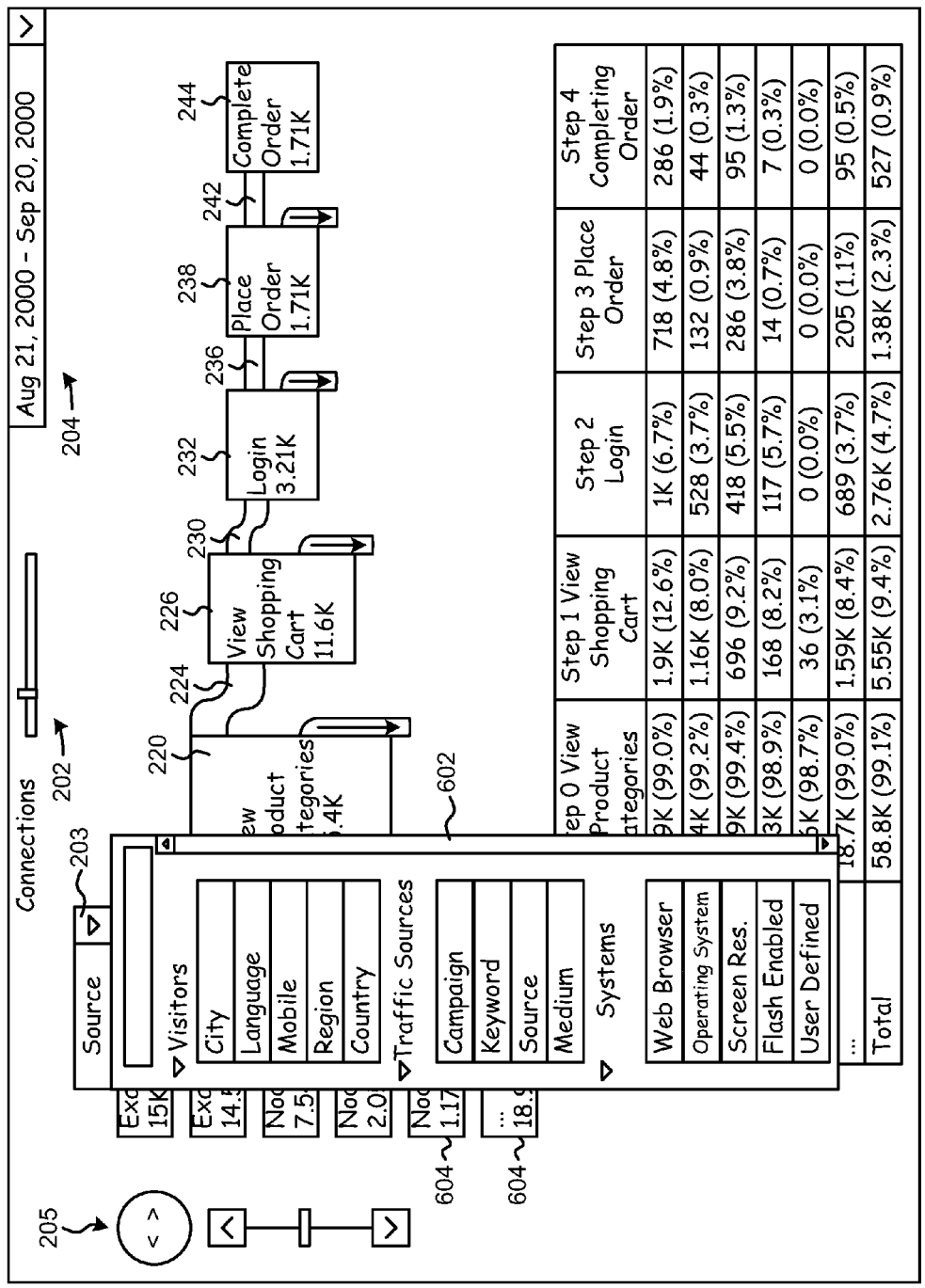
FIG. 6 is an illustration of an example visualization of online traffic showing a selection of a source type.

FIG. 6 is an illustration of an example visualization 600 showing a selection of a source type. As shown, source input 203 may be used to receive a selection 602 of a source type. The traffic data used to generate visualization 600 may include any number of different metrics regarding users, user devices, network traffic patterns, etc. For example, source nodes 604 are grouped based on the type of web browser used by the different users. Associated with source nodes 604 may also be statistics regarding the web browsers, such as the total number of users that use a particular web browser, the percentage of total users that use a particular web browser, or other similar statistics. For example, the number of users that access the various nodes in visualization 600 using the Android web browser is shown to be 1,230. System information, such as the web browser used, may be relevant to the website operator and to others, to ensure that a visited website is optimized for certain web browsers.

In some implementations, source nodes 604 may differ in type from the rest of the nodes in visualization 600. For example, source nodes 604 may be grouped by web browser, while node 220 may be a group of web pages (e.g., URLs, etc.) for one or more websites. In further implementations, nodes 220, 226, 232, 238, and 244 may also include indicia to denote the various groups of source nodes 604 flowing through the nodes. For example, node 220 may include various colors, bars, etc., that denote the makeup of traffic through node 220 corresponding to the source type. For example, a portion of node 220 may be colored red to denote those users that used an Internet Explorer web browser, while another portion of node 220 may be colored green to denote those users that used a Firefox web browser. Other forms of indicia may also be used, such as icons, text, images, logos or the like, to demarcate traffic through a node based on the selected source type.

In some implementations, source 203 may be provided by a user defined variable. For example, a user may define a variable in their website and then track that variable through the analytics website. For example, the user may want to segment the visitors by "time of day" based on when the visitors visit the website. In some implementations, the user may define segment that is a combination of the above described sources. A list of possible ways to segment visitors is listed in FIG. 6, such as but not limited to, City, Language, Mobile, Region, Country, Campaign, Keyword, Advertisement Group, Advertisement Slot, Advertisement Content, Source, Medium, Web Browser, Operating System, Operating System Version, Flash version, Java Support, Screen Colors, Service Provider, Domain, Screen Resolution, Flash Enabled, Event Category, Event Actions, Event Level, User Defined and etc.

Traffic paths leading from source nodes in a visualization may also differ, depending on the source type. For example, traffic paths 606 differs from those of traffic paths 218 in FIGS. 2-4. Traffic paths 606 may vary in size to show the relative amount of traffic that arrives at node 220 using the various web browsers represented by source nodes 604. In one implementation, the height, width or length dimension of the traffic paths 606 may vary. When non-source nodes (e.g., nodes 220, 226, 232, 238, and 244) represent groups of web pages, traffic paths between such nodes may remain the same, even when the source type is changed via source input 203. In this way, an interested party may view visualization 600 to determine which web browsers are most heavily used, while still being able to view the flow of traffic between the different levels of visualization 600.

Figure 7:
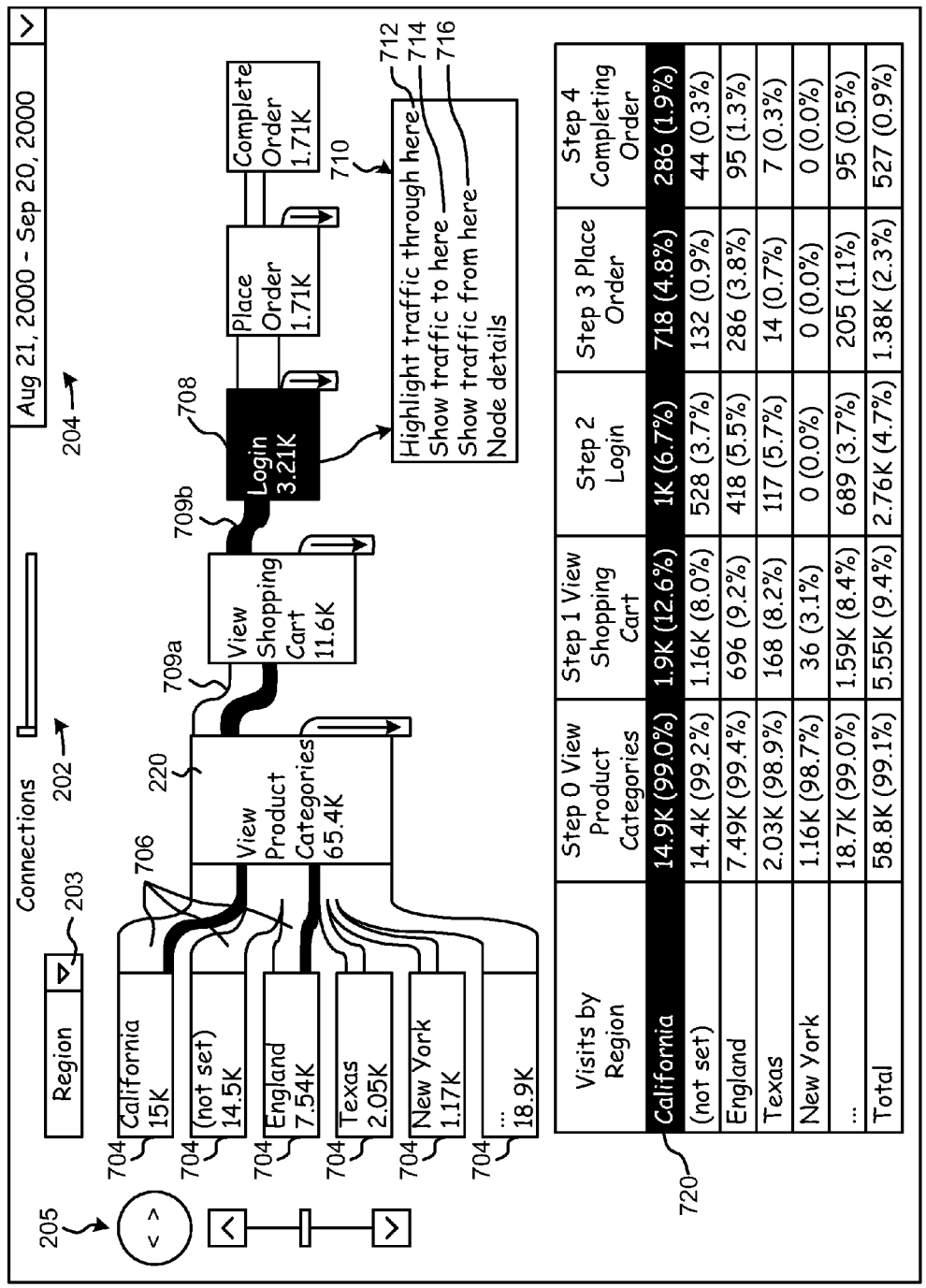
FIG. 7 is an illustration of an example visualization of online traffic showing sources based on region.

FIG. 7 is an illustration of an example visualization 700 of online traffic showing source nodes 704 based on region. As shown, source input 203 has been used to receive a selection 602 of a region source type. Source region information may be determined, for example, through analysis of location data (e.g., via GPS, cellular triangulation, etc.), or other ways of determining the geographic location of an electronic device that accesses a web page of a node. Connectors 706 may represent the traffic arriving at node 220 from the geographic regions of source nodes 704. Similar to traffic paths 606, traffic paths 706 may also differ based on the selected source type. In this way, information regarding where users reside can be conveyed via visualization 700, as well as information regarding the network traffic between nodes 220, 226, 232, 238, and 244.

As shown in FIG. 7, a user may select node labeled login 708 using a user input device. A plurality of user input devices may be used, such as but not limited to, keyboard, mouse, a surface capable of receiving touch input, finger, etc. For example, a node selection using the left click of a mouse may display the menu 710 with a plurality of choices for the node login 708. In one example implementation, the menu 710 includes a plurality of choices, such as but not limited to, highlight traffic through node 712, show traffic to here 714, show traffic from here 716, and node details 718.

The visualization 700 shows an illustration where the user has chosen to visualize show traffic to here 714. Accordingly, the portion of the traffic that visited the login 708 node is highlighted, in this implementation in black. The node being selected is highlighted in black. The connector 709b with traffic going into login 708 node is highlighted. The portion of the connector 709a that provided traffic to login 708 is highlighted. The portions of connectors 706 that had traffic going to login 708 are highlighted. Being able to highlight certain traffic allows the user can see that all the traffic to the login 708 is coming from the two region, California and England. In other words the visitors from Texas or New York are not going to the login 708. Moreover, the website owner may be able to optimize the website for Texas or New York visitor to make it easier for those users to login.

The highlight traffic through here 712 menu option would highlight traffic prior to the visitors reaching the login 708 and highlight traffic after the visitors went away from the login 708. Accordingly, the user may be able to highlight the fact that a particular node leads to a minimal number of conversions.

The highlight traffic from here 716 menu option would highlight traffic after the visitors went away from the login 708. Accordingly, the user may be able to highlight the fact that a particular node leads to a minimal number of conversions.

The node details 718 menu option allows the user to see various metrics and information regarding a node. For example, the user may be able to see a list of web pages that were clustered together to form the node. The user may also be able to see statistical information regarding the number of visits, number of drop offs, percentage of total visits, percentage of total drop offs. Other lists that may be displayed is the list of incoming web pages, list of outgoing web pages, list of dropped off web pages. All the data regarding the visualization 700 may be downloaded on the user device at once from the server computers.

The table displayed below the graphical diagram in visualization 700 corresponds to the nodes displayed above. For example, a user may select California and all traffic that originated from the California region may be highlighted. Accordingly, the user can see where the traffic from California ends up. Accordingly, each item in the table may have a link that modifies the graphical display according to the selection made. Similarly, the selections made for in graphical display can modify the table displayed below the graphical display.

Figure 8A:
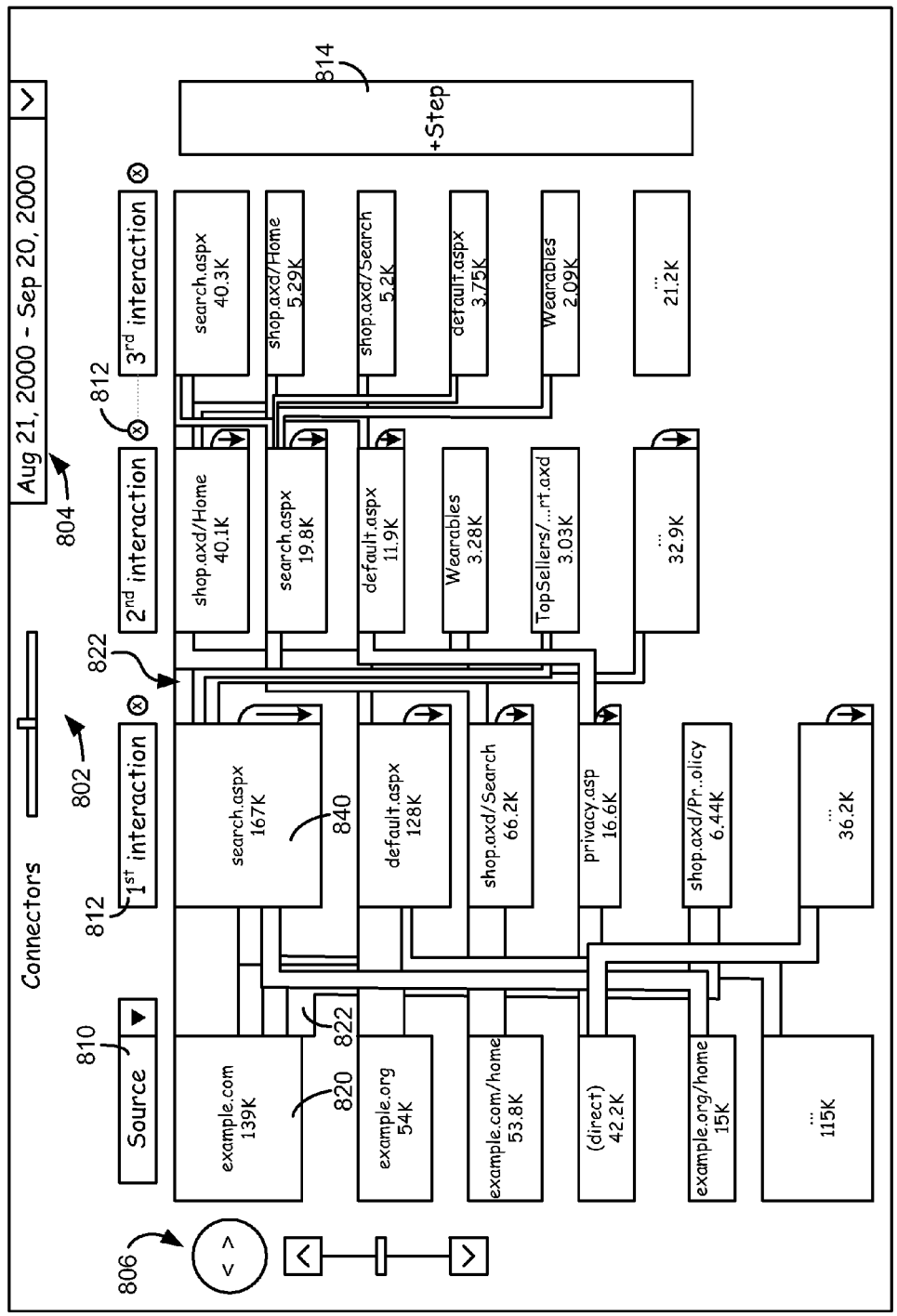
FIG. 8*a* is an illustration of an example visualization of traffic and resources displaying one or more connectors in accordance with a described implementation.

Referring to FIG. 8a, FIG. 8a displays data associated with a flow path related to visitor traffic and traffic sources is shown in accordance with a described implementation. FIG. 8a illustrates an internet traffic graph related to internet traffic and internet resources displaying one or more connectors in accordance with a described implementation. The visualization 800 shows how a visitor travels throughout a website via web pages. A user may view (e.g., click, highlight, touch, etc.) a node 820 to show traffic in and out of the node, details of the node 820 (e.g., incoming, outgoing, the plurality of resources that define the node, etc.). In some implementations, the user may view (e.g., click, highlight, touch, etc.) the plurality of resources (e.g., websites, URL items, views, conversions, transactions, etc.) that define the node 820. In some implementations, the user may view the connectors (e.g., flow paths) 822, which may include internet traffic through nodes 820. In some implementations, the user may view internet sources by visitors (e.g., city, language, region, etc.), sources 810 (campaign, keyword, source, medium, etc.), or systems (browser, operating system, screen resolution, internet provider, etc.). In some implementations, the user may determine the date and/or time range 804 for the nodes. In some implementations, the user may add further interactions using interface 814 or delete further interactions via interface 812. For example, the user may only want to view the source and the 3rd interaction. In some implementations, the user may view more or fewer connectors, using the connection tool 802. In some implementations, the user may view any node 820 where there is a match to a selected keyword. In some implementations, the user may view additional nodes by adding a node via interface 814. In some implementations, the user may view less nodes or scroll through nodes using interface 806. In some implementations, the user may view a moderate amount of connectors 822. However, the user may want to view more or less connectors 822.

Figure 8B:
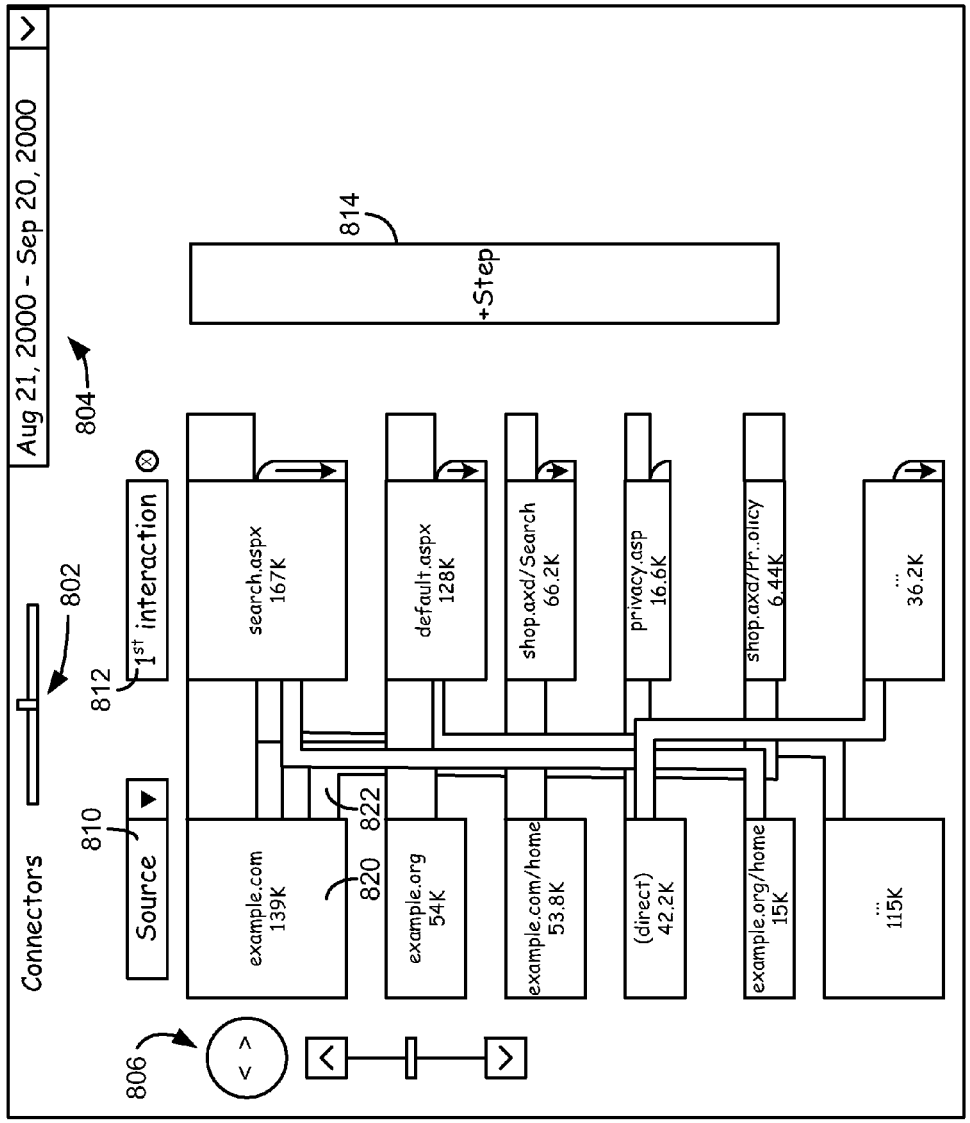
FIG. 8*b* illustrates a portion of the example visualization from FIG. 8*a* as modified by input received from the user in accordance with a described implementation.

FIG. 8b illustrates a portion of the example visualization from FIG. 8a as modified by input received from the user in accordance with a described implementation. FIG. 8b illustrates the nodes in the source column and the $1^{st}$ interaction column because the system received input from the user via user interface 812. User interface 812 is configured to remove in this example embodiment, the $2^{nd}$ interaction and the $3^{rd}$ interaction. Accordingly, the column for which interface 812 is activated is removed and all other columns with one or more nodes receiving network traffic from the nodes from the removed column. Accordingly, if there was a $4^{th}$ interaction column that was displayed, it would be removed as well. A user may select the "+step" interface 814 once and make the 2d interaction column with each node and connector reappear in FIG. 8b. If the interface 814 is selected again the $3^{rd}$ interaction column with each node and connector would reappear in $3^{rd}$ interaction column.

Figure 8C:
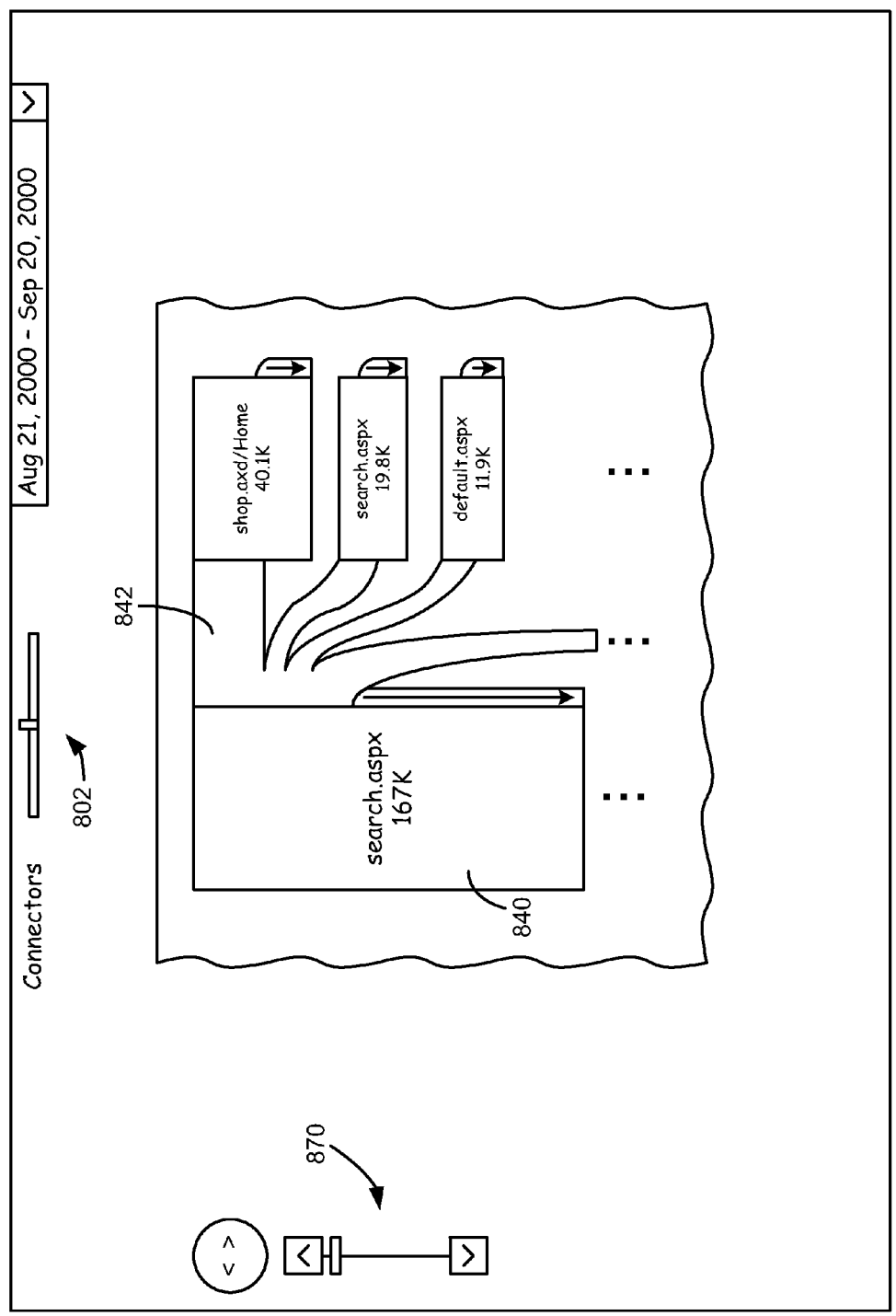
FIG. 8*c* illustrates a portion of the example visualization from FIG. 8*a* as modified by input received from the user in accordance with a described implementation.
Figure 9:
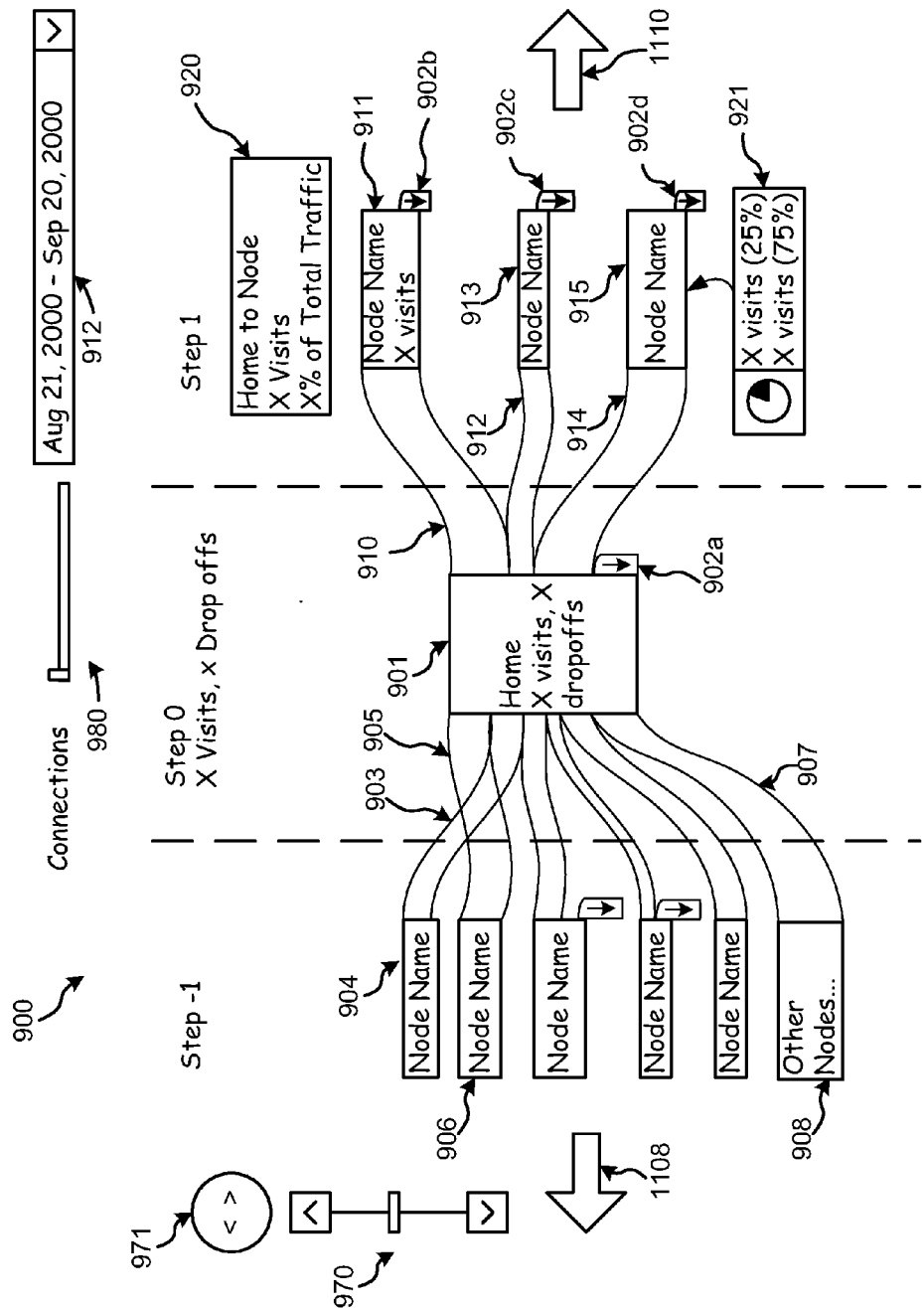
FIG. 9 is an illustration of an example visualization of network traffic from the user selected URL.

FIG. 8c illustrates a portion of the example visualization from FIG. 8a as modified by input 870 received from the user in accordance with a described implementation. Input 870 allows a user to enlarge a portion of the visualization 800 from FIG. 8a. The slider of the input 870 is moved to reflect the user's decision to view an enlarged version of visualization 800. In some implementations, the user may manually eliminate nodes or connectors. For example, the user may only want to view connector(s) to a specific node. In some implementations, the user may right-click, highlight, etc. to remove connectors that the user does not want to view. As shown in FIG. 8c, the size of node 840 is increased compared to FIG. 8a and the size of each of the connected node is also increased to allow the user to see only a subset of the traffic. FIG. 9 allows the user to see a visualization 900 that shows incoming and outgoing network traffic for one node.

FIG. 9 is an illustration of an example visualization 900 showing network traffic from the user selected URL or selected node. A user may have entered a URL or other regular expression and selected a web page or cluster of web pages (node). In another implementation, a user may select any node that is displayed on the screen and choose to see a visualization that is centered on that node, as discussed in greater detail below. Accordingly, there are at least two ways of accessing a single node centric visualization, first by typing in the URL into a menu, second by selecting a node and requesting that the node is used as the center node for the visualization.

Visualization 900 is a sankey or sankey type diagram as shown in FIG. 9. Sankey diagrams are the types of diagrams where the size and shape of the nodes and the connectors represents one or more data values. In this example implementation, the user selected node is displayed in the center of the visualization under the heading step 0. In visualization 900, the node labeled home 901 is displayed at step 0. Within the node information regarding the node is displayed such as the number of visits the node had incoming and the number of visits where the users dropped off. The size of home 901 in the visualization reflects the amount of the traffic or the number of visits that visited the web pages in the node home 901. In an example implementation, the amount of traffic going into a node should be equal to the amount of traffic that is going out of a node.

Visualization 900 also displays traffic flow information between nodes. For example, connector 903 represents the flow of traffic from node 904 to home 901. In various implementations, visualization 900 may also provide indicia of the amount of traffic between nodes (e.g., by varying the appearance of traffic flows by traffic volume, by providing icons or text indicative of traffic volume, or by other ways of conveying the amount of traffic between nodes). For example, connectors 903, 906 and 907 vary in size in visualization 900, thereby representing their different traffic volumes. Similarly, connectors 903, 905, and 907 represent the flow of traffic from nodes 904, 906, and 908 to home 901.

Visualization 900 may also show drop-off traffic flows. In general, a drop-off traffic flow is one in which a user exits the process (e.g., by stopping their web browsing session, by leaving to visit a different retailer's website, or by leaving to visit a website with a different top level domain, etc.). As shown, drop-off traffic paths 902a, 902b, 902c and 902d are attached to various nodes, to denote the flow of traffic away from each of these steps (e.g., that do not return to another node associated with a goal in visualization 900). In some implementations, drop-off traffic flows may include indicia that distinguishes them from other traffic flows (e.g., by applying a coloration, text or icon, etc.). For example, drop-off traffic path 902a may be colored red to denote the flow of traffic away from the home 901 (e.g., by going to a competitor's website, by stopping the shopping process, navigating away from the domain name of the visualization etc.). In other implementations, the length dimension of the drop-off traffic paths represents the amount of traffic that dropped off. For example, the length of drop-off 902a is larger than the length of drop-off 902d, accordingly, a larger amount of traffic dropped off from home 901 than node 915.

Visualization 900 is also shown to include time input 912, according to some implementations. Time input 912 is configured to receive a selection of a time or date range for which visualization 900 is to be generated. For example, time input 904 may receive a selection of a date range that can be used to filter traffic information provided by visualization 900. By way of example, an advertiser may wish to view website traffic information around a certain holiday, to tailor an advertising campaign. In other implementations, time input 912 may be preset (e.g., the previous week, the previous month, a time period defined in a user's profile, etc.).

Visualization 900 may also include zoom input 970, which receives a selection of a zoom level. For example, a user of visualization 900 may use zoom input 970 to zoom out, thereby showing more nodes. Zoom input 970 may also be used to zoom in, thereby focusing the display of visualization 900 on only a subset of nodes. Zoom input 970 may be one or more icons, a sliding bar, or other selectable area of visualization 900. The zoom input 970 may allow a user to enlarge the size of each node and connector that is shown in visualization 900. Visualization 900 may include a scroll input 971 which receives a selection of a scroll left or right inputs. For example, a user of visualization 900 may wish to scroll to a right or left portion of the visualization.

In some implementations, visualization 900 may include a connection selector 980. Connection selector 980 receives a selection of an amount of traffic flows to be displayed on visualization 980. As shown, connection selector 980 is set to display only a minimal amount of traffic flows on visualization 980. Connection selector 980 may be an input field that receives a number of flows to display, one or more icons (e.g., an up and down arrow), a slide bar, or any other selectable area for receiving a selection on visualization 900.

Visualization 900 also shows home 901 in one column that is labeled step 0 and the set of nodes (911, 913 and 915) that receive traffic from home 901 in a column labeled step 1. In this implementation, the nodes (e.g. 904, 906 and 908) have traffic going to home 901 are in another column labeled step −1. In this implementation, in any column there can be only a limited number of nodes. For example, in the column labeled step −1, there are a total of 6 nodes. The last node 908 is an aggregate of all websites that were not included in the 5 nodes above node 908. The nodes with the largest amount of traffic are shown and the nodes with smaller amount of traffic are consolidated in node 908. Accordingly, this feature allows the user to see the most significant nodes and connectors.

Visualization 900 allows the user to interact with each node and connector that is displayed in the visualization. For example, if a user input device hovers over the area occupied by the connector 910, the user may be shown a connector display 920 that states which nodes are being connected by the connector. The user pointing device hovering over connector 910 would display, home 901 to node 911 (i.e. the two nodes being connected by the connector). The connector display 920 also shows the number of visits that are represented by the connector (i.e. x visits) and the percent of total traffic that is represented by the connector 910. The total traffic for connector 910 would the sum of the traffic that is outgoing from the previous column, in this example home 901.

If the user pointing device hovers over a node such as node 915, node hover display 921 may be generated. The node hover display 921 may include the number of visits that dropped off and the percentage to the number of visits that dropped off. Also the number of visits and related percentage that went on to other nodes. For example, in visualization 900, 25% of the visit dropped off and 75% of the visits went to other nodes. Also shown in node hover display 921 is a graphical representation of the visits data. The graphical representation may be a pie chart, line graph or the like. A user may be provided with an option to modify the node hover display 921.

Figure 10:
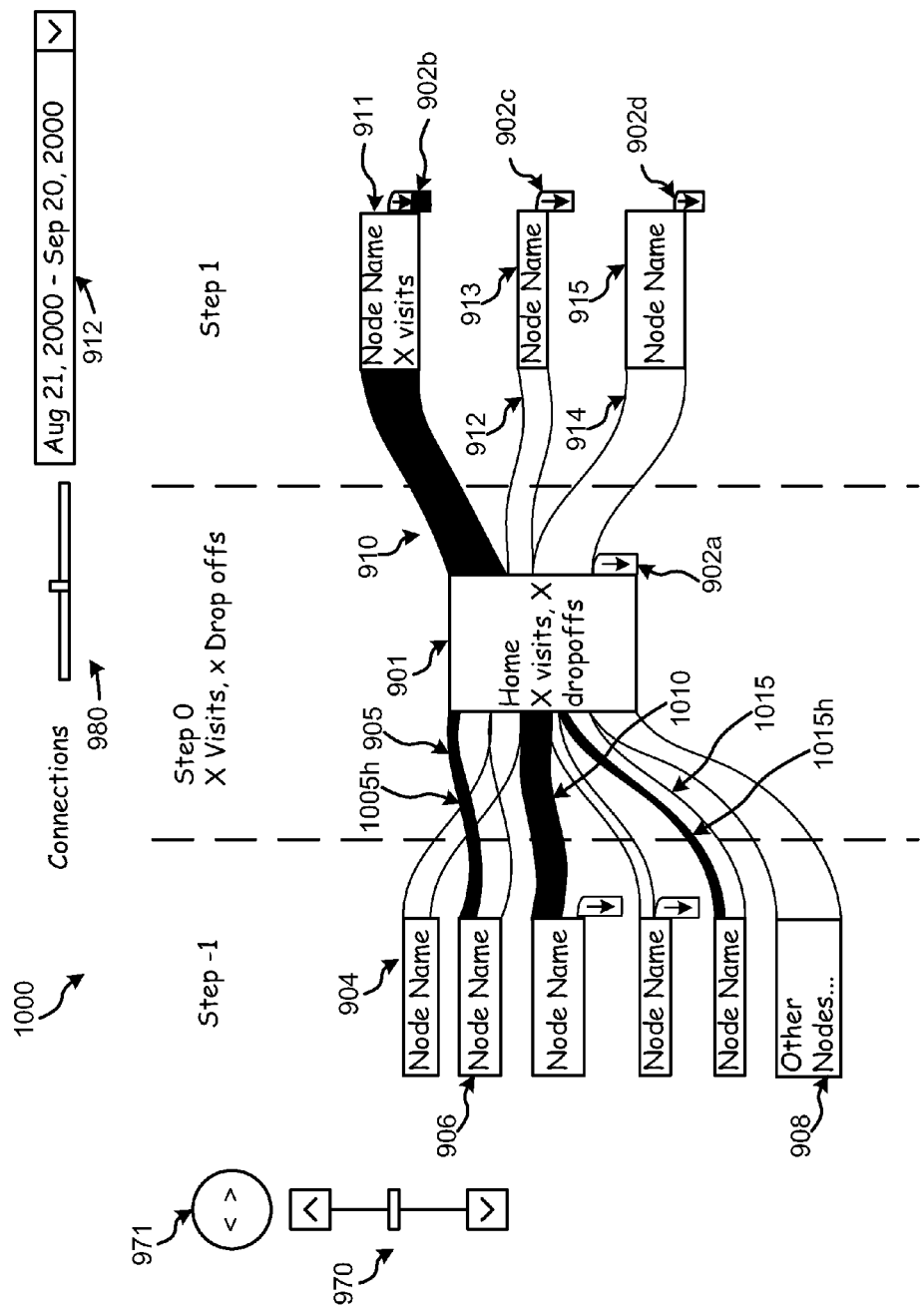
FIG. 10 is an illustration of an example visualization of a selected path from FIG. 9.

When a user selects a connector, the visualization highlights various connectors with traffic that traveled through the selected connector. For example, when a user selects connector 910, all other connectors that have traffic that passed through connector 910 may be highlighted. (See. FIG. 10)

Figure 11:
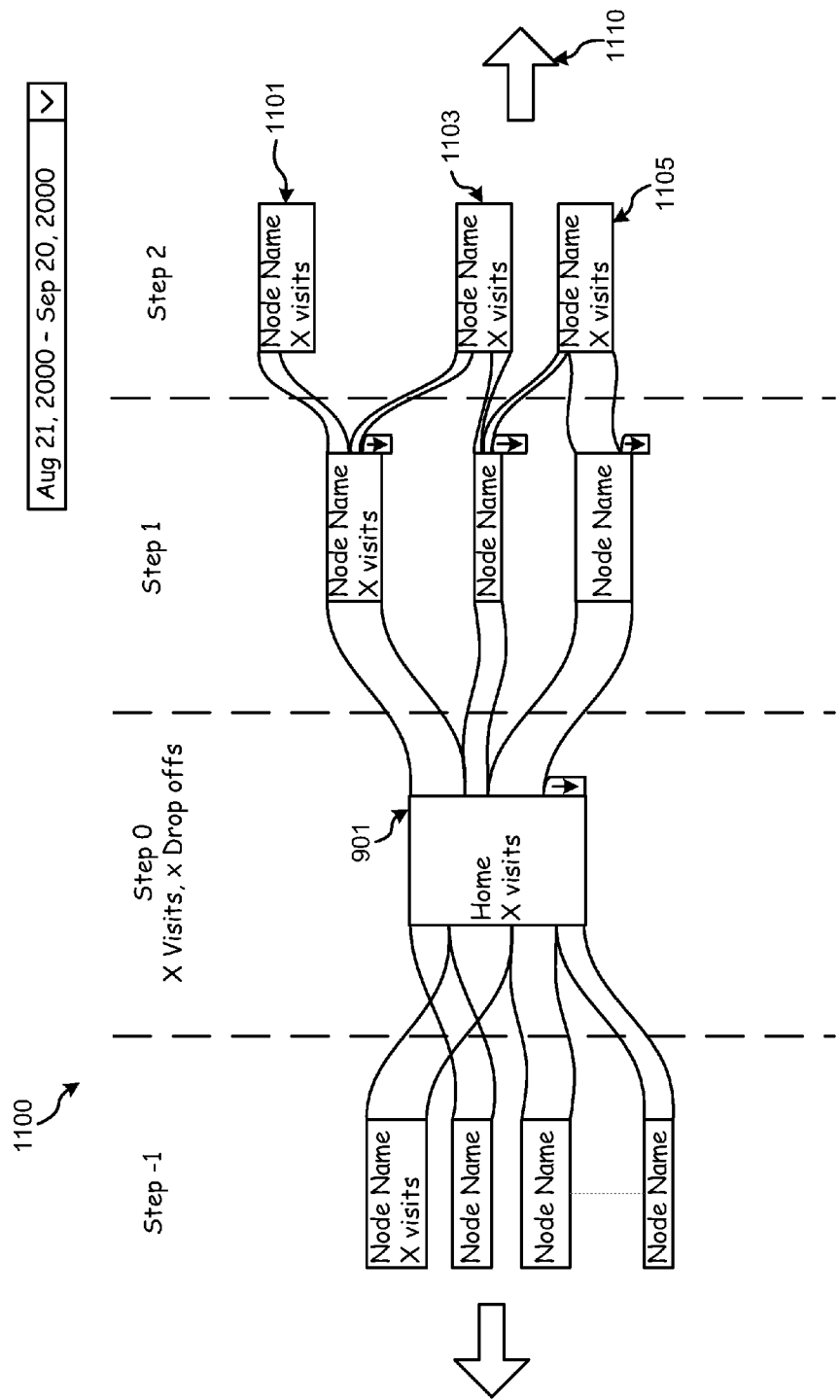
FIG. 11 is an illustration of an example visualization where the user wishes to more outbound traffic from the user select URL from FIG. 9.

FIG. 10 is an illustration of an example visualization 1000 of a selected connector 910. In FIG. 10 the user had selected connector 910, causing a change in color in the selected connector. In some implementations, the color of the highlighted connector may be changed. In some implementations, the color may be darker or lighter than previously displayed. In some implementations, the color of the unselected connector may be made lighter or darker. Various other connectors that had portions of their traffic go through connector 910 are also highlighted. If the visualization 1000 had more columns such as step 2 (as shown in FIG. 11), then all network traffic coming to connector 910 and traffic going away from connector 910 would be highlighted as well. In some embodiments, all traffic that generated or came from the selected connector may be highlighted. All traffic includes nodes and connectors that are more than one column away from the selected connector or node.

In visualization 1000, traffic 1005h is highlighted. The traffic 1005h is a portion of the traffic from connector 905. Traffic 1005h came from node 906 traveled through home 901 and then a portion of it went to node 911. In an example implementation, hovering over traffic 1005h will display the percentage and the number of visits out of the total visits from connector 905 that went through connector 911.

In visualization 1000, all of the traffic from connector 1010 is highlighted because 100% of the traffic from connector 1010 went to home 901 and contributed to the traffic of connector 910. In visualization 1000, portion of the traffic from connector 1015 is highlighted as 1015h. By hovering over 1015h the user may receive more information regarding the number of visits and the percentage of visits that are being highlighted.

Moreover, each time a connector is highlighted it is possible that some of the traffic from the connector dropped off. Accordingly, a portion of drop-off 902b is highlighted because that portion of the traffic from the connector 910 dropped-off. The other portion of the traffic from the connector 910 may have visited to another node.

FIG. 11 is an illustration of an example visualization 1100 of an additional set of nodes that may be visualized from FIG. 9. For example, a user may select outbound button 1110 from FIG. 9. An additional outbound column labeled "step 2" may be generated. The step 2 column is two columns removed from user selected home 301 at step 0. The additional nodes 1101, 1103 and 1105 may be repeated from the nodes from step −1. On many occasions a user may go from one node to another node and back to the original node. In this type of visualization, nodes may be repeated from one column to another. The user may choose to add additional columns by choosing outbound button 1110 or inbound button 1108. In some implementations, the user may add up to eleven steps in each direction before the user device requests additional traffic flow data from the performance analysis apparatus 120.

Figure 12:
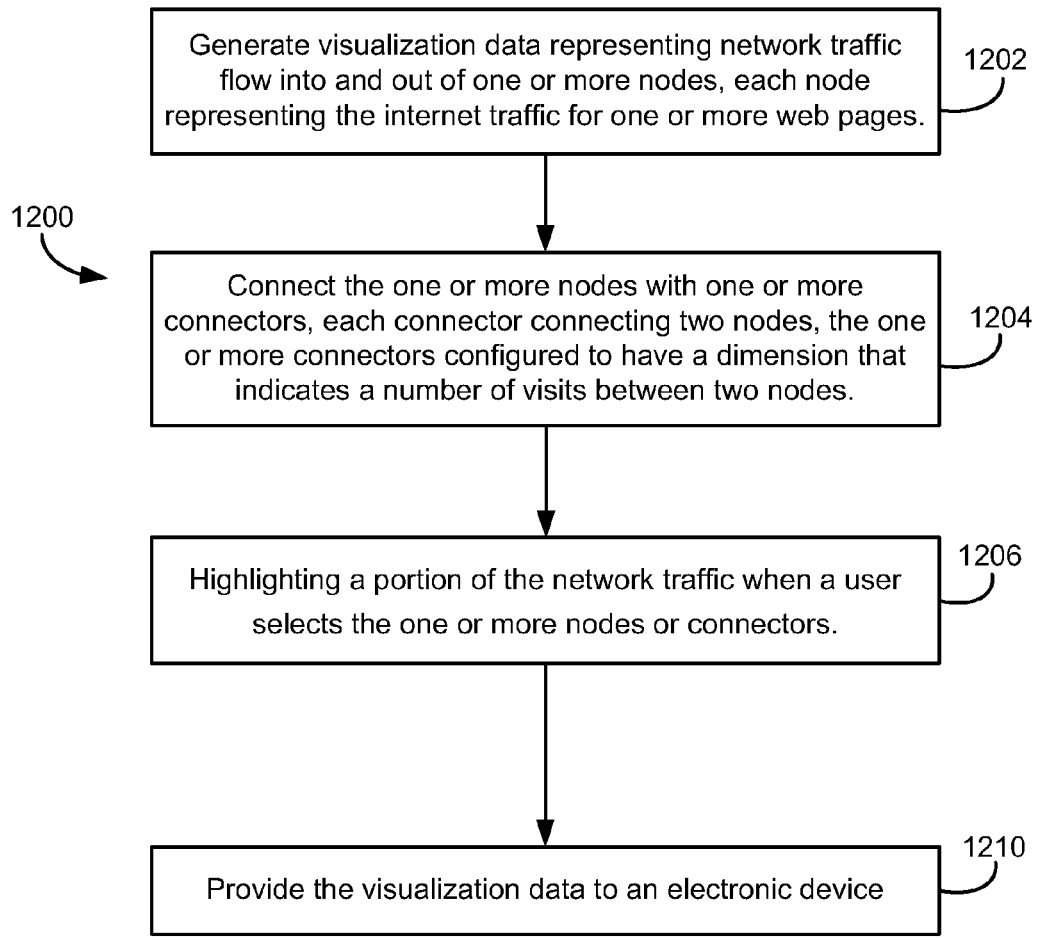
FIG. 12 is a process that may be implemented by the systems shown in FIGS. 1 and/or 13, according to an illustrative implementation.

FIG. 12 is a flow diagram of an example process 1200 that may be implemented by the systems shown in FIGS. 1 and/or 13, according to an illustrative implementation. In some implementations, process 1200 may be performed by a server that aggregates network traffic data (e.g., performance analysis apparatus 120 in FIG. 1, etc.). For example, a server may utilize process 1200 to generate a visualization of the network traffic and provide visualization data to a user device. In other implementations, the network traffic data may first be downloaded to a user device that utilizes process 1200 to analyze the traffic data (e.g., using one or more scripts, programs, or other routines running on the user device).

Process 1200 may include generating visualization data representing network traffic flow into and out of one or more nodes, each node representing the internet traffic for one or more web pages (block 1202). For example, nodes may be clusters of websites, URLs, servers, or other groups of content sources in the network. Nodes may also be based on geographic location information, demographic information, system configuration information (e.g., the hardware and/or software used to access a content source), or other information. In some implementations, nodes may be grouped based on a plurality of factors. For example, a node may be based on both geographic information and system configuration information. Traffic paths connect nodes and represent a grouping of network traffic between nodes. For example, one node may be a cluster of URLs for www.example.com and a second node may be a cluster of URLs for www.example.org.

Additionally or alternatively, the process 1200 includes connecting the one or more nodes with one or more connectors, each connector connecting two nodes, the one or more connectors configured to have a dimension that indicates a number of visits between two nodes (block 1204). In general, the one or more connectors have a height or width dimension that corresponds to the amount of network traffic that visited the two nodes that are connected by the connector. In one implementation, the general width dimension of the connector is approximately perpendicular to the direction of the network traffic flow.

Additionally or alternatively, the process 1200 includes highlighting a portion of the network traffic when a user selects the one or more nodes or connectors (1206). In general, a user may choose to highlight traffic that flow through a node or a connector. The system is configured to highlight network traffic that is multiple levels removed from the selected node or connector. In some embodiments, the user may choose to highlight at least two nodes or connectors that are in the same column. Highlighting allows the users to visualize what portion of the network traffic is contributing to the results. Accordingly, the user may optimize results such as, conversions or purchase of item.

Process 1200 may include providing the visualization data to an electronic device (block 1210). In some implementations, the electronic device may be one or more electronic displays. For example, a user device that processes received network traffic data may provide the visualization data directly to an electronic display. In other implementations, the visualization data is generated by a server or other remote device and provided to a user device. The user device, in turn, may use the visualization data to cause an electronic display to display the visualization. For example, the visualization data may be generated by a server and provided to a user's computer, which then uses the visualization data to display the visualization data on a monitor.

Network traffic visualization generates an interactive graphical representation of internet traffic data. The system generates a graphical representation of the nodes (each node representing a plurality of web pages or resource) and connectors between two nodes that represent the internet traffic from one to the other. The path that the internet traffic took may vary from the source to various landing pages that led to the completion of a goal or entire visit. Additionally, the graphical representation also includes a rendering of the internet traffic that did not reach the goal and at which internet location the internet users abandoned the path towards a conversion.

Each node represents one or more web pages that have been clustered together. The relative size of each connector that connects two nodes represents the relative size of the traffic that connects two nodes together. In other embodiments, the connectors may represent other metrics instead of the internet traffic. User interactions clicking or hover over a node or an edge and segmenting the traffic are clearly defined to surface the exit pages, conversion rates, and other relevant data in an interactive way.

When a user's mouse hovers over an edge connecting two nodes, an overlaid window displays the number of page views that the edge represents. When a user's mouse hovers over a node an overlaid window displays the node information to the user. The node information includes a pie chart for the amount of traffic that went to other nodes and the amount of traffic that dropped off. The node information also includes the number of visitors that went to other nodes and the number of visitors that dropped off.

When a user clicks on a connector, all the traffic that comes to and passes through the connector is highlighted. When a user clicks on a node a menu with various choices is shown that allows a user to pick between three choices i) highlight traffic through here, ii) show group in flow navigation visualization, iii) group details. If the user selects highlight traffic through here, then the traffic that originated from other nodes to the selected node is highlighted and the traffic going to the other nodes from the selected node is highlighted. After highlighting the traffic related to a particular node the user might choose to clear the highlighting. If the user chooses to clear the highlighting the original flow that was displayed prior to the highlighting is restored. In certain flow diagrams the user can click on "+step" button to increase the number of nodes that led to other nodes or followed that the last set of nodes that are being displayed.

Website traffic may be visualized using flow diagrams. The diagrams may be Sankey type diagrams. The elements and layout in the flow diagram are specifically designed to surface main patterns of web site traffic without overwhelming the users. Accordingly, pages or groups of pages (nodes) with the highest number of visitors are displayed before other nodes are displayed. User interactions such as clicking or hover over a node or an edge, segmenting the traffic, searching/merging/parting a node or a group of nodes is supported to provide an intuitive user experience.

Figure 13:
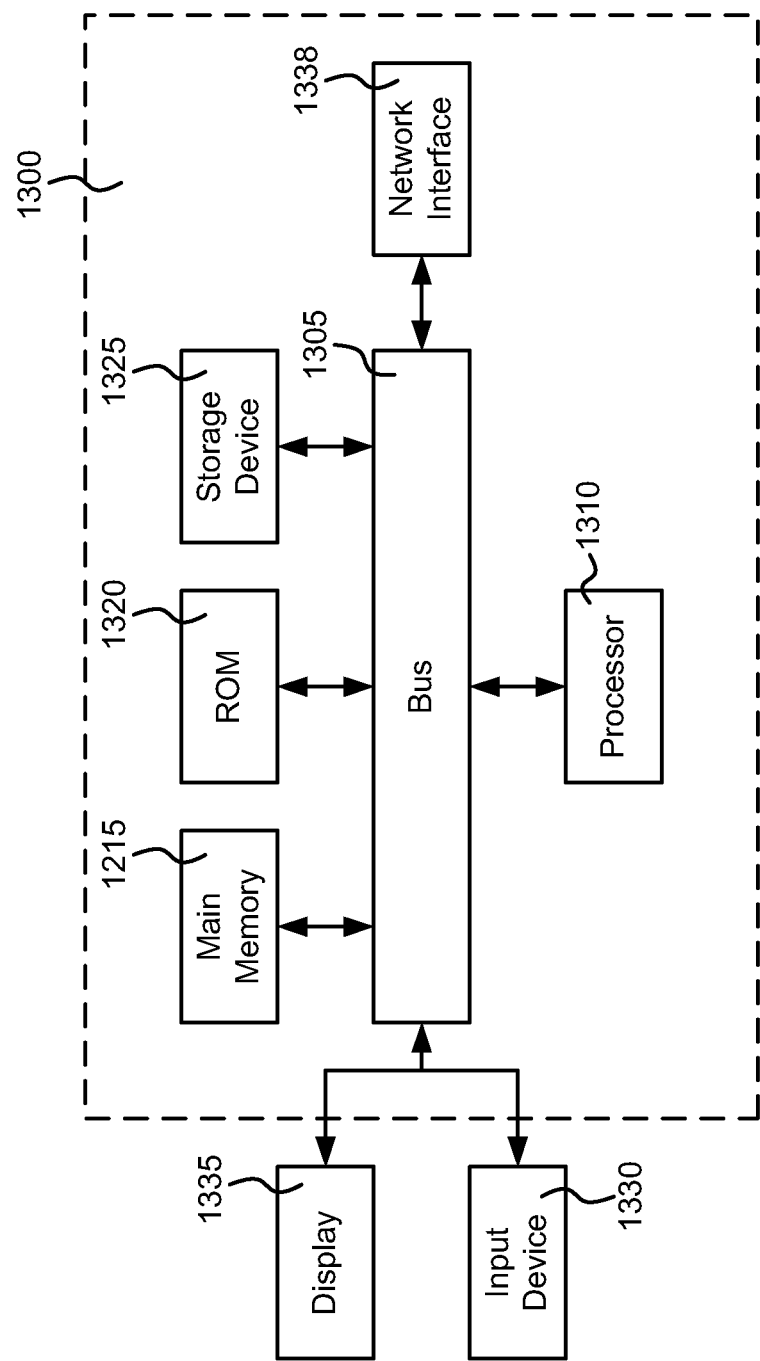
FIG. 13 is a block diagram of an example processing circuit in accordance with an illustrative implementation.

FIG. 13 is a block diagram of an example of a computer system 1300 consistent with an illustrative embodiment. The computer system 1300 that can be used to provide user interaction reports, process log files, implement an illustrative performance analysis apparatus 120, and/or implement an illustrative advertisement management system 110. The computing system 1300 includes a bus 1305 or other communication mechanism for communicating information and a processor 1311 coupled to the bus 1305 for processing information. The computing system 1300 also includes main memory 1315, such as a random access memory (RAM) or other dynamic storage device, coupled to the bus 1305 for storing information, and instructions to be executed by the processor 1311. Main memory 1315 can also be used for storing position information, temporary variables, or other intermediate information during execution of instructions by the processor 1311. The computing system 1300 may further include a read only memory (ROM) 1320 or other static storage device coupled to the bus 1305 for storing static information and instructions for the processor 1311. A storage device 1325, such as a solid state device, magnetic disk or optical disk, is coupled to the bus 1305 for persistently storing information and instructions.

The computing system 1300 may be coupled via the bus 1305 to a display 1335, such as a liquid crystal display, or active matrix display, for displaying information to a user. An input device 1330, such as a keyboard including alphanumeric and other keys, may be coupled to the bus 1305 for communicating information, and command selections to the processor 1311. In an embodiment, the input device 1330 has a touch screen display 1335. The input device 730 can include a cursor control, such as a mouse, a trackball, or cursor direction keys, for communicating direction information and command selections to the processor 1311 and for controlling cursor movement on the display 1335. Computing system 1300 may also include network interface 1338. Network interface 1338 is configured to receive and transmit data over a data network. For example, network interface 1338 may include an Ethernet port, a wireless transceiver, a telephone port, or any other type of data network interface.

According to various embodiments, the processes that effectuate illustrative embodiments that are described herein can be implemented by the computing system 1300 in response to the processor 1311 executing an arrangement of instructions contained in main memory 1315. Such instructions can be read into main memory 1315 from another computer-readable medium, such as the storage device 1325. Execution of the arrangement of instructions contained in main memory 1315 causes the computing system 1300 to perform the illustrative processes described herein. One or more processors in a multi-processing arrangement may also be employed to execute the instructions contained in main memory 1315. In alternative embodiments, hard-wired circuitry may be used in place of or in combination with software instructions to implement illustrative embodiments. Thus, embodiments are not limited to any specific combination of hardware circuitry and software.

In another embodiment, instead of the user initiating a search by entering a search phrase to perform a search of a particular media type or media types, information can be pushed to the user history information. The user history information can be, for example, information corresponding to web sites visited by the user within the current user session or the last few user sessions. For example, if the user visits a first fashion handbag company web site and a second fashion handbag company web site, then advertisement data of the first and second fashion companies and other high-end handbag manufacturers can be pushed to the user when the user visits one or more of these web sites during a user session. Thus, instead of information being pulled from a user based on input by the search (e.g., a keyword search input), in which relevant advertisements are matched with searched information of a particular media type, in this other embodiment, relevant advertisement information is pushed to the user based on a history of web sites which the user has visited recently. In one particular implementation of this embodiment and referring to the example above, the history information is used to push high priced handbag advertisements to the user together with search results obtained from a search request made by the user, even when the search request is unrelated to high priced handbags. So, if the user requested search results to be performed on a particular professional football team, and whereby the user had previously visited the first and second fashion handbag company web pages prior to conducting the search, relevant advertisements may be pushed to the user in a search results display screen, in which those advertisements are directed to handbags made by the first and second fashion companies that are related to the particular professional football team (e.g., have that team's logo somewhere on the handbag).

Although an example processing system has been described in FIG. 13, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on a non-transitory storage media, e.g., a machine-generated electrical, optical, or electromagnetic media that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated media. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, while certain embodiments have been described with respect to searching of a single media type, i.e., image search or video search, one or more embodiments are also relevant to a generic search where the search results are blended with different media types. Thus, for example, a user can type in a keyword search phrase into an Internet search engine and obtains results that contain images, video and other media types blended with text results, and in which relevant matching advertisements are obtained (and provided to the user) that match one or more of these multi-media search results. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
generating visualization data representing internet traffic flow into or out of a plurality of nodes, each node of the plurality of nodes representing one or more web pages, the visualization data connecting the plurality of nodes with a plurality of connectors,
each connector of the plurality of connectors connecting two or more nodes, each connector of the plurality connectors having a dimension that indicates a number of visits between two or more nodes;
receiving user input to highlight traffic flowing through a selected node or a selected connector; and
highlighting a path of all traffic flowing through the selected node or the selected connector,
wherein the highlighted path includes a first portion of an unselected connector, the first portion having a first height dimension indicative of a first number of visits to the selected node or the selected connector that flowed through the unselected connector,
the unselected connector having a second portion having a second height dimension indicative of a second number of visits that flowed through the unselected connector that did not flow through the selected node or the selected connector.

2. The method of claim 1, wherein a selection of a node of the plurality of nodes or a connector of the plurality of connectors generates an overlay display that provides information regarding the amount of traffic through the node or the connector.

3. The method of claim 1 further comprising allowing the user to view the traffic sorted by at least one of visitor parameter, traffic source parameter, or system parameter.

4. The method of claim 3, wherein visitor parameter comprises at least one of city, language, country, region, or mobile; wherein traffic source parameter comprises at least one of campaign, source or medium; and wherein system parameter comprises at least one of web browser, operating system, screen resolution, or flash enabled.

5. The method of claim 1 further comprising: displaying information regarding the selected node or the selected connector, the display of information including overlaying a chart that shows an amount of traffic that left the node and an amount of traffic that continued to another node.

6. The method of claim 5, wherein displaying information includes displaying the percentage of total traffic that went through the node or connector to other nodes or connectors.

7. The method of claim 1, wherein the visualization of the visualization data is divided into columns, each column having up to six nodes.

8. The method of claim 1, wherein generating visualization data comprises indicating the portion of the network traffic that exited a node of the plurality of nodes.

9. The method of claim 1, wherein the dimension of the connector that indicates a number of visits between two or more nodes is a height of the connector.

10. The method of claim 1 further comprising:
generating an overlay display that provides information regarding the amount of traffic through a node of the plurality of nodes or a connector of the plurality of connectors in response to a mouseover of the node or the connector.

11. The method of claim 1 further comprising:
displaying a menu in response to a selection of the selected node or the selected connector, the menu having options to highlight traffic through the selected node or the selected connector, show a group including the selected node or the selected connector in a flow visualization, or display information regarding the selected node or the selected connector.

12. A system comprising: a processor; and a computer-readable storage device storing instructions that, when executed by the processing module, cause the processing module to perform operations comprising:
generating visualization data representing internet traffic flow into or out of a plurality of nodes,
each node of the plurality of nodes representing one or more web pages, each node of the plurality of nodes having a dimension that indicates a number of visits to the each node, plurality of nodes connected to a plurality of connectors,
each connector of the plurality of connectors connecting two or more nodes, each connector of the plurality of connectors having a dimension that indicates a number of visits between two or more nodes;
receiving user input to highlight traffic flowing through a selected node or a selected connector; and
highlighting a path of all traffic flowing through the selected node or the selected connector, wherein the highlighted path includes a first portion of an unselected connector, the first portion having a first height dimension indicative of a first number of visits to the selected node or the selected connector that flowed through the unselected connector,
the unselected connector having a second portion having a second height dimension indicative of a second number of visits that flowed through the unselected connector that did not flow through the selected node or the selected connector.

13. The system of claim 12 further comprising allowing the user to view the traffic sorted by at least one of visitor parameter, traffic source parameter, or system parameter.

14. The system of claim 13, wherein visitor parameter comprises at least one of a city, language, country, region, or mobile; wherein traffic source parameter comprises at least one of a campaign, source or medium; and wherein system parameter comprises at least one of a web browser, operating system, screen resolution, or flash enabled.

15. The system of claim 12, wherein the visualization of the visualization data is divided into columns, each column having up to six nodes.

16. The system of claim 12, wherein the computer-readable storage device stores instructions that cause the processing module to perform further operations comprising:
generating an overlay display that provides information regarding the amount of traffic through a node of the plurality of nodes or a connector of the plurality of connectors in response to a mouseover of the node or the connector.

17. The system of claim 12,
wherein the computer-readable storage device stores instructions that cause the processing module to perform further operations comprising:

displaying a menu in response to a selection of the selected node or the selected connector, the menu having options to highlight traffic through the selected node or the selected connector, show a group including the selected node or the selected connector in a flow visualization, or display information regarding the selected node or the selected connector.

18. One or more non-transitory computer-readable media having instructions stored therein, the instructions executable by one or more processors to cause the one or more processors to perform operations comprising:

generating visualization data representing internet traffic flow into or out of a plurality of nodes, each node of the plurality of nodes representing one or more web pages, the visualization data connecting the plurality of nodes with a plurality of connectors, each connector of the plurality of connectors connecting two or more nodes, each connector of the plurality of connectors having a dimension that indicates a number of visits between two or more nodes; and highlighting a path of all traffic flowing through the selected node or the selected connector, wherein the highlighted path includes a first portion of an unselected connector, first portion having a first height dimension that indicates indicative of a first number of visits to the selected node or the selected connector that flowed through the unselected connector, the unselected connector having a second portion having a second height dimension indicative of a second number of visits that flowed through the unselected connector that did not flow through the selected node or the selected connector.

19. The one or more computer-readable media of claim 18, wherein highlighting the path of all traffic includes highlighting traffic in more than one node.

20. The one or more computer-readable media of claim 18, wherein a selection of a node of the plurality of nodes or a connector of the plurality of connectors generates an overlay display that provides information regarding the amount of traffic through the node or the connector.

* * * * *